(12) United States Patent
Okamoto et al.

(10) Patent No.: US 7,845,805 B2
(45) Date of Patent: Dec. 7, 2010

(54) DISCHARGE LAMP LIGHTING APPARATUS AND PROJECTOR

(75) Inventors: Masashi Okamoto, Hyogo (JP);
Takanori Samejima, Hyogo (JP);
Akihiko Sugitani, Hyogo (JP);
Yoshihiro Horikawa, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 556 days.

(21) Appl. No.: 11/987,701

(22) Filed: Dec. 4, 2007

(65) Prior Publication Data

US 2008/0137041 A1    Jun. 12, 2008

(30) Foreign Application Priority Data

Dec. 6, 2006    (JP)    ............... 2006-328905

(51) Int. Cl.
*G03B 21/20*    (2006.01)
*H05B 41/36*    (2006.01)

(52) U.S. Cl. .................... 353/85; 315/209 R

(58) Field of Classification Search ............ 353/85; 315/291, 224, 209 R
See application file for complete search history.

(56) References Cited

U.S. PATENT DOCUMENTS

| 5,917,558 | A | 6/1999 | Stanton |
| 6,520,648 | B2 | 2/2003 | Stark et al. |
| 7,443,103 | B2 * | 10/2008 | Li et al. ................. 315/209 R |

FOREIGN PATENT DOCUMENTS

| JP | 8-505031 A | 5/1996 |
| JP | 2004-526992 A | 9/2004 |
| JP | 2006-059790 A | 3/2006 |
| JP | 2006-227440 A | 8/2006 |
| WO | WO 02/063391 A | 8/2002 |

* cited by examiner

*Primary Examiner*—Thanh X Luu
(74) *Attorney, Agent, or Firm*—Rader, Fishman & Grauer PLLC

(57) ABSTRACT

A discharge lamp lighting apparatus for lighting a discharge lamp, comprises an inverter which reverses a polarity of an output voltage and applies alternating voltage to the discharge lamp, and an inverter control circuit which generates an inverter control signal defining a polarity reversal operation of the inverter, based on a polarity reversal timing signal, wherein when the number of polarity reversals in one cycle of the polarity reversal timing signal is even, the inverter control circuit intermittently performs a first operation in which successive pulse-like part of the polarity reversal operation based on the polarity reversal timing signal is disregarded by odd number of times.

13 Claims, 14 Drawing Sheets

DISCHARGE LAMP LIGHTING APPARATUS AND PROJECTOR

CROSS-REFERENCES TO RELATED APPLICATION

This application claims priority from Japanese Patent Application Serial No. 2006-328905 filed on Dec. 6, 2006, the contents of which are incorporated herein by reference in its entirety.

TECHNICAL FIELD

Described herein is a high-pressure discharge lamp used in a projector, and especially a discharge lamp lighting apparatus for turning on a high intensity discharge lamp, such as a high-pressure mercury lamp, a metal halide lamp, and a xenon lamp, and a projector using the discharge lamp lighting apparatus.

BACKGROUND

For example, in a projector for an optical device used for image display like a liquid crystal projector or a DLP (Trademark) projector, a high intensity discharge lamp (HID lamp) is used. In such a projector, light is separated into the three primary colors of red, green, and blue, i.e., by a dichroic prism etc., so that a space modulation element provided for each color generates an image of each of the three primary colors. The optical paths thereof are merged by a dichroic prism etc., so as to display a color image.

FIG. 22A shows a schematic view of the structure of a filter. As shown in the figure, the filter which comprises a color wheel having transmission color areas of R, G, and B which are three primary colors (i.e., an R color area (A3r), a G color area (A3g), and a B color area (A3b)) is rotated. This filter, i.e., a dynamic color filter, generates light flux of the three primary colors one by one by letting light from a light source, pass therethrough. In synchronization therewith, a space modulation element is controlled, so that an image of each of the three primary colors is generated sequentially in a time dividing manner, thereby displaying a color image. When brightness is important, as shown in FIG. 23A, W, i.e., white, may be added to the three primary colors of R, G and B, so that the dynamic color filter has four colors, (an R color area (A4r), a G color area (A4g), a B color area (A4b), and a W color area (A4w)), so that images of the four colors are generated one by one thereby displaying a color image. Or, furthermore, a color image may be displayed, by providing much more color areas thereon, thereby reinforcing color expression capability.

In a discharge lamp lighting apparatus for lighting a discharge lamp as described above, while voltage called a no-load open circuit voltage is impressed to a lamp at start-up, high voltage is impressed to the lamp, in order to generate dielectric breakdown in an electrical discharge space, so that the discharge state changes from glow discharge to arc discharge, and finally, the discharge lamp lighting apparatus is operated so that stable regular lighting may be realized. The lamp discharge voltage which was low, for example, about 10V, immediately after shifting to the arc discharge, goes up gradually in connection with a temperature rise, and is stabilized at fixed voltage in a lighting steady state. Usually, such a discharge lamp lighting apparatus has a converter which adjusts an output of an input power supply to a lamp discharge voltage, in order to realize a predetermined input power supplied to the lamp thereby outputting the required lamp current. Moreover, lamp voltage, i.e., output voltage of the converter, is detected, and based on this information, target lamp current is determined according to a value of the quotient which is obtained by dividing, for example, the target electric power by the detection voltage.

As types of discharge lamp driving methods, there are a direct current driving method in which a lamp is turned on by a converter, and an alternating current driving method in which periodic polarity reversals are performed by additionally providing an inverter further in the downstream side of the converter. In the case of the direct current driving method, since the light flux from the lamp is like direct current, that is, it does not change with passage of time, basically, there is a big advantage that it can be similarly applied to both types of the above-described projectors. On the other hand, in the case of the alternating current driving method, there is an advantage that growth or consumption of electrodes of the discharge lamp may be controlled, by using the flexibility of polarity-reversal frequency, which the direct current driving method does not have. On the other hand, there are disadvantages, resulting from existence of polarity reversals, that is, overshoot, instantaneous light-out at the time of polarity reversals etc., occur, thereby causing a bad influence on a display image etc.

Usually, in the alternating current driving method, transient phenomena, such as a slow change in lamp current, overshoot and oscillation, occurs every polarity reversal, due to induction components, such as a capacitance component which exists in the downstream side of an inverter, or a starting circuit. Since such a phenomenon appears in form of changes, such as, instantaneous light-out of the light flux from a lamp, overshoot, and oscillation, etc. almost as they are, when such a driving method is applied to a time dividing type projector among the above projectors, timing at which images are generated one by one in the time dividing manner, do not match timing at which the polarity is reversed in an alternating current driving method of a lamp, that is, the change appears in a display image at beat frequency, so that, there is a problem that it is very offensive to eyes of viewers, depending on the beat frequency. In order to solve the problem, the color wheel rotation is synchronized with the polarity-reversal timing of the inverter. However, the transient phenomena, such as a slow change in lamp current, or conversely overshoot or oscillation, which occurs every polarity reversal, cannot be avoided. Since it is difficult to effectively use lamp light emission at the period at which this phenomenon occurs, timing of a polarity-reversal operation of the discharge lamp lighting apparatus is adjusted, usually, in order that polarity reversal takes place at a period where the colors of the dynamic color filter are switched.

On the other hand, in order to obtain high color-reproduction performance of a display image, it is important to adjust spectrum distribution of a light source lamp and a form of conversion to the color sequential light flux, upon use of the dynamic color filter. In the case of the color wheel, it is possible to improve a color-reproduction performance or to carry out a desired color-reproduction performance by adjusting angle distribution of R, G, and B areas of the color wheel, that is, the rate of a period per rotation during which light transmits through each color area, according to the spectrum of the lamp. Depending on circumstances, in addition to the R, G, B, white (W) may be added.

For example, when using a lamp which runs short of an R component, as shown in FIG. 22B, or FIG. 23B, the occupancy angle ratio of each of an R color area (A3r', A4r'), a G color area (A3g', A4g'), and a B color area (A3b', A4b') and further a W color area (A4w') around a rotational axis is set to uneven, so that the angle of the transmission area of the R component is enlarged. As shown in FIG. 24A or FIG. 25A, which schematically show a waveform of lamp current (IL'), respectively, it is effective to make transmission time rate of the R component longer than those of the other colors. In addition, reference characters, such as "R", "G", "B", and "W" in the waveform of the lamp current (IL') shown in FIGS. 24A, 24B, 25A and 25B, etc., respectively show periods of the main colors R, G, B, and W of the generated light flux of a dynamic color filter, that is, an R color period (Tr), a G color period (Tg), a B color period (Tb), and a W color period (Tw). As described below, the same reference characters are used in other figures.

However, in case where a desired color-reproduction performance is obtained in such a method in a DLP system type projector, since the brightness for every color of each pixel of a display image is controlled by a duty cycle ratio control operation on each pixel of a space modulation element, there is a problem that it is difficult to carry out fine control of pixel gradation, in the color component whose light transmission time rate is reduced. In order to solve such a problem, for example, in Japanese Laid Open Patent (Tokuhyo) No. H08-505031, it is proposed that, in an image projection apparatus, a light source drive control unit which changes an output power of the light source, synchronizing with the color of an optical beam outputted from a color change unit is provided. Similarly, in Japanese Laid Open Patent No. 2004-526992, a color-display apparatus in which electric power having two levels corresponding to colors is supplied, is proposed. In short, the common feature of such technology is modulation in which a pulse is superimposed on lamp current corresponding to the filter color which is appearing in a projector. As shown in FIG. 24B, or FIG. 25B, shortage of the R component is supplemented by making the lamp current (IL') at the R component transmission period, larger than that of the other colors.

However, as described above, even if transmission time rate is made longer so as to supplement the shortage of the color component, or even if modulation is carried out so that a pulse may be superimposed on the lamp current, there is a problem that has not been solved. Although in a discharge lamp, at least at time of arc discharge, electrons which jump out of a cathode due to thermionic emission reach an anode, and then unnecessary kinetic energy is released, between the electrodes of the discharge lamp, much more heat is generated, i.e., a thermal load is large, in the anode than the cathode since the released kinetic energy is transformed into heat energy. In a discharge lamp which is operated in an alternating current driving method, the relation of the cathode and anode is switched every time polarity reversal takes place between the two electrodes.

In conditions in FIGS. 24A, 24B, 25A and 25B, in order to compensate shortage of an R component, in the polarity-reversal phase corresponding to the R component, a period from polarity reversal to the following polarity reversal is set to long or the current value thereof is set to large. However, in the conditions in FIGS. 25A and 25B, the polarity-reversal phase corresponding to the R component appears in and is always limited to a period where the lamp current (IL') is positive. Therefore, under the conditions, in one of the two electrodes of the discharge lamp operated in an alternating current driving method, which becomes an anode, larger heat is always generated threat than the other electrode, at the polarity-reversal phase corresponding to the R component, so that the thermal load of these electrodes become imbalanced. For this reason, for example, one of electrodes is consumed intensively, whereby there is a problem that the lamp life span becomes short as the whole.

On the other hand under condition in FIGS. 24A and 24B, the polarity-reversal phase corresponding to the R component appears when the lamp current (IL') is positive, and when it is negative, alternatively. Therefore, under this condition, there is no problem that the thermal load unbalance of the electrodes occurs. The reason why there is a difference as to existence or non-existence of the problem between the former condition and the latter condition is that while on the former condition, the number of times of the polarity reversals in an operation of one cycle of a dynamic color filter in the discharge lamp-lighting apparatus is odd, on the latter condition it is even.

In addition, although the example in which a period from polarity reversal to the following polarity reversal is extended in the polarity-reversal phase corresponding to the R component, and the example in which lamp current is increased, are shown above, a period from polarity reversal to the following polarity reversal may be changed similarly in the polarity-reversal phases corresponding to the other color or two or more color components. The situation is the same even when the lamp current is changed by the modulation, or even when the length of time from polarity reversal to the following polarity reversal is changed in addition to the modulation of the lamp current.

For this reason, for example, as proposed in Japanese Laid Open Patent No. 2006-227440, in a discharge lamp lighting apparatus, the number of times of the polarity reversals in an operation of one cycle of a color wheel whose number of the colors is even, is controlled to odd number of times. Moreover, it is proposed that a way of modulation of lamp current is adjusted so as to restrict the conditions so that integrated current values of both polar in an operation of one cycle of the color wheel are substantially the same. However, in the proposed method, although there is no problem as to the unbalance of the thermal load of the electrodes, a lamp has to be turned on under the restricted condition which is out of the desired operation condition, so that there is a problem that flexibility of the lamp lighting operation conditions is restricted.

SUMMARY

According to the embodiments described herein, in a discharge lamp lighting apparatus which is operated in an alternating current driving method in which polarity reversal is repeated, in case the length of time from time of polarity reversal to the following polarity reversal is changed periodically, or the lamp current is changed periodically by modulation, even when the number of times of the polarity reversals in an operation of at least one cycle in the discharge lamp lighting apparatus is even, it is possible to solve the problem that unbalance of thermal load between these two electrode of the discharge lamp occurs, without restricting the flexibility of the way of the changes.

A discharge lamp lighting apparatus for lighting a discharge lamp, comprises an inverter which reverses a polarity of an output voltage and applies alternating voltage to the discharge lamp, and an inverter control circuit which generates an inverter control signal defining a polarity reversal operation of the inverter, based on a polarity reversal timing signal, wherein when the number of polarity reversals in one cycle of the polarity reversal timing signal is even, the inverter control circuit intermittently performs a first operation in which successive pulse-like part of the polarity reversal operation based on the polarity reversal timing signal is disregarded by odd number of times.

In the discharge lamp lighting apparatus, a periodical modulation may be performed on lamp current flowing through the discharge lamp, synchronizing with the polarity reversal timing signal.

The discharge lamp lighting apparatus may further include an initialization information demodulation circuit which determines whether the polarity reversal timing signal is modulated and specifies a phase in one cycle of the polarity reversal timing signal, wherein when the initialization information demodulation circuit receives the polarity reversal timing signal and determines that the polarity reversal timing signal is modulated, a count value of a polarity reversal phase track counter is initialized in order to hold the phase of the one cycle of the polarity reversal signal.

In the discharge lam lighting apparatus, a second operation in which successive parts of the polarity-reversal operation based on the polarity reversal timing signal is disregarded by even number of times, may be performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

Further, a projector for projecting an image by using light flux generated from a discharge lamp, wherein the discharge lamp is lighted by a discharge lamp lighting apparatus, the discharge lamp lighting apparatus comprising: an inverter which reverses a polarity of an output voltage and applies alternating voltage to the discharge lamp; and an inverter control circuit which generates an inverter control signal defining a polarity reversal operation of the inverter, based on a polarity reversal timing signal, wherein when the number of polarity reversals in one cycle of the polarity reversal timing signal is even, the inverter control circuit intermittently performs a first operation in which successive pulse-like part of the polarity reversal operation based on the polarity reversal timing signal is disregarded by odd number of times.

In the projector, the image is projected by using color sequential light flux converted by a dynamic color filter, and the polarity reversal timing signal is generated depending on a color of the color sequential light flux.

Thus, even a period from time of polarity reversal to the following polarity reversal is changed periodically, or the lamp current is changed periodically by modulation, it is possible to offer a discharge lamp lighting apparatus or a projector capable of solving the problem that unbalance of thermal load between these two electrode of the discharge lamp occurs, without restricting the flexibility of the way of the changes.

BRIEF DESCRIPTION OF DRAWINGS

Other features and advantages of the present discharge lamp lighting apparatus and a projector will be apparent from the ensuing description, taken in conjunction with the accompanying drawings, in which.

DETAILED DESCRIPTION

Figure 1:
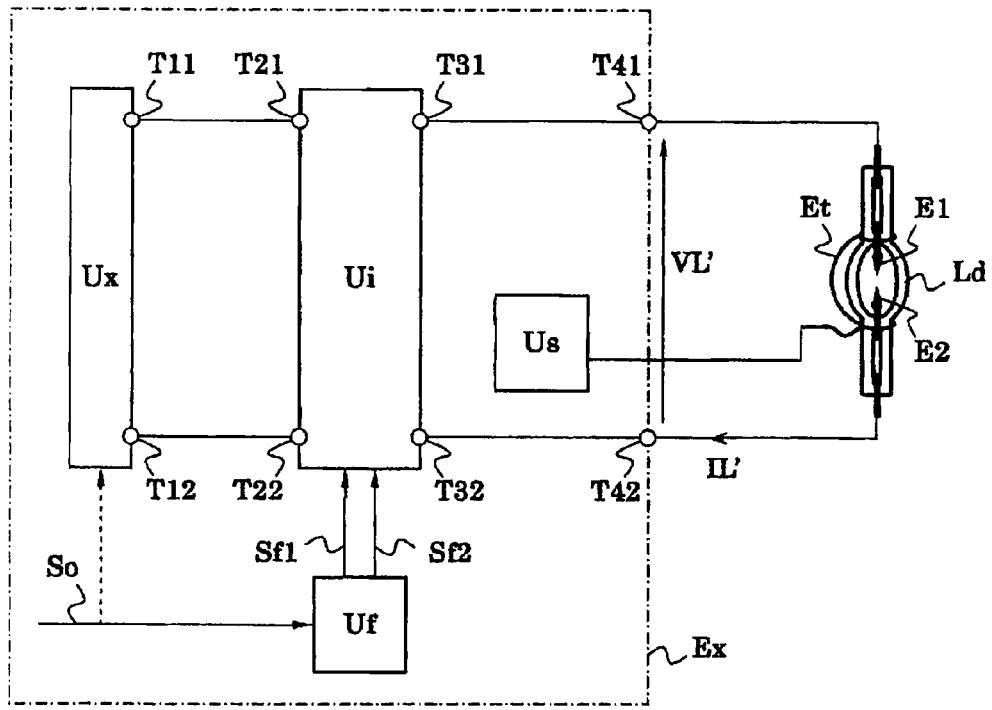
FIG. 1 is a schematic block diagram showing an embodiment of a discharge lamp lighting apparatus according to an embodiment.

First, an embodiment of the present invention will be described, referring to FIG. 1 which is a schematic block diagram of a discharge lamp lighting apparatus according to an embodiment. An output from a power supply circuit (Ux) for supplying electric power to a discharge lamp (Ld) is applied to electrodes (E1, E2) for a main discharge of the discharge lamp (Ld) through an inverter (Ui). A step down chopper circuit etc. shown in FIG. 14 which is described below may be used as the power supply circuit (Ux). A full bridge circuit etc. shown in FIG. 13 which is described below may be used as the above-mentioned inverter (Ui).

A starter (Us) for starting the electric discharge is connected to the discharge lamp (Ld). Although this figure shows a so-called external trigger type discharge lamp in which high voltage is impressed to an auxiliary electrode (Et) provided outside the enclosure of the discharge lamp (Ld), the type of trigger of the discharge lamp is not significant to the essence of the embodiment. That is, it is possible to use, for example, a trigger system in which a high-voltage pulse generating circuit is provided in series to the electrodes (E1, E2) for main discharge, so that high-voltage pulse is impressed to the electrodes, or a trigger system in which high voltage generated by resonance, is impressed the electrodes.

A polarity-reversal timing signal (So) which determines polarity-reversal timing of the inverter (Ui) is inputted into an inverter control circuit (Uf). Inverter control signals (Sf1, Sf2) which determine a polarity-reversal operation of the inverter (Ui) based on the polarity-reversal timing signal (So) are generated. For example, when a color wheel shown in FIG. 23B is used as a dynamic color filter, the polarity-reversal timing signal (So) is generated so as to be activated at time of a change of colors of the dynamic color filter. Usually, when the polarity-reversal timing signal (So) is activated, the inverter control circuit (Uf) generates the inverter control signals (Sf1, Sf2) so that the polarity of the inverter (Ui) may be inverted immediately (so as to sandwich a dead time period which is described below).

However, in the embodiment, the inverter control circuit (Uf) inserts intermittently an operation which disregards the polarity-reversal operation at odd number of times based on the polarity-reversal timing signal (So). For example, in FIG. 2 which is a schematic timing chart of the embodiment, a specific part (a01) of the polarity reversal timing signal (So) is disregarded, so that the inverter (Ui) may not perform the inversion operation, even if it receives the signal. Moreover, FIG. 3 which is a schematic timing chart of the embodiment, shows a state where a series of three specific parts (a11, a12, a13) of the polarity reversal timing signal (So) is disregarded, so that the inverter (Ui) may not perform the inversion operation, even if it receives the signal. In addition, in these figures, (a) represents the polarity reversal timing signal (So), and (b) represents the lamp current (IL'), respectively.

Figure 2:
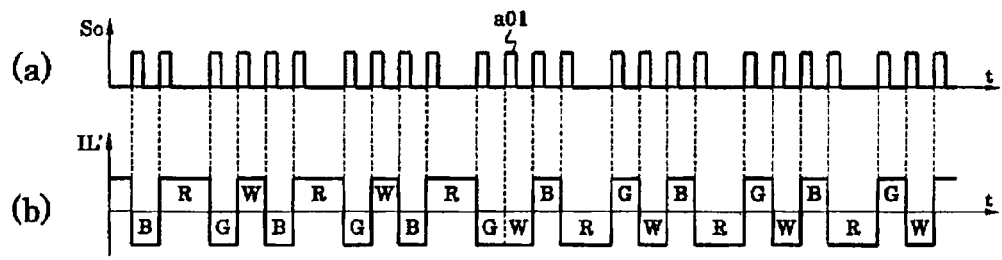
FIG. 2 is a schematic timing chart showing an embodiment of a discharge lamp lighting apparatus.
Figure 3:
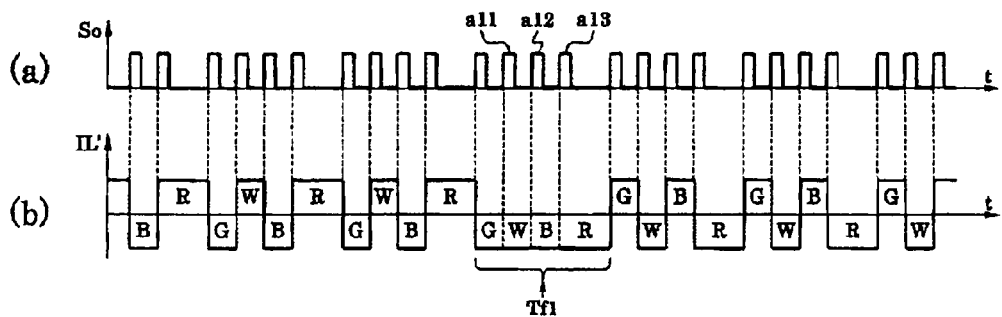
FIG. 3 is a schematic timing chart showing an embodiment of a discharge lamp lighting apparatus.
Figure 25A:
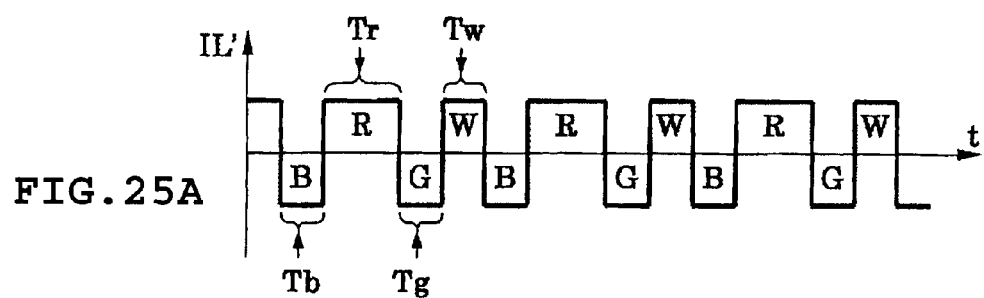
FIGS. 25A and 25B are schematic timing charts of a conventional discharge lamp lighting apparatus.

Compared with the waveform shown in FIG. 25A which shows the schematic waveform similar to that of the conventional technology, while in FIG. 25A, the polarity-reversal phases (phases R), in each of which a period from polarity reversal to the following polarity reversal is extended, appear only when the lamp current (IL') is positive, in (b) of FIG. 2B or (b) of FIG. 3, there are periods in which the polarity-reversal phases (phases R) with a long period from polarity reversal to the following polarity reversal appear when the lamp current (IL') is positive, and also when it is negative. Since this positive and negative appearance periods are switched (by turns), every time an operation, in which successive pulse-like part of a polarity-reversal operation based on the polarity reversal timing signal (So) is disregarded by odd number of times, is inserted intermittently, the problem of the unbalance of the thermal load in the two electrodes of the discharge lamp can be avoided by setting up the frequency of this intermittent insertion suitably.

Figure 23A:
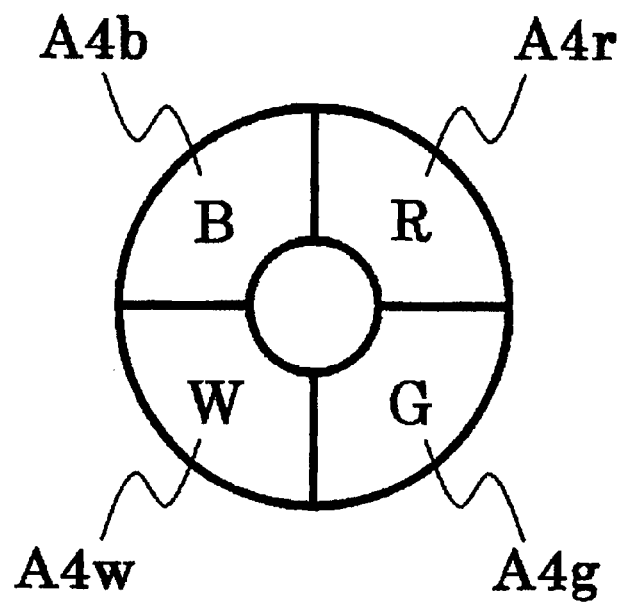
FIGS. 23A and 23B are schematic views of a filter.
Figure 23B:
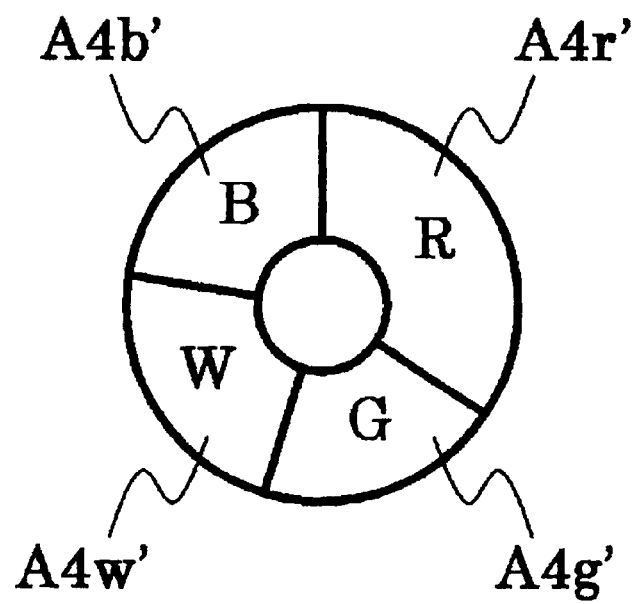
Figure 24A:
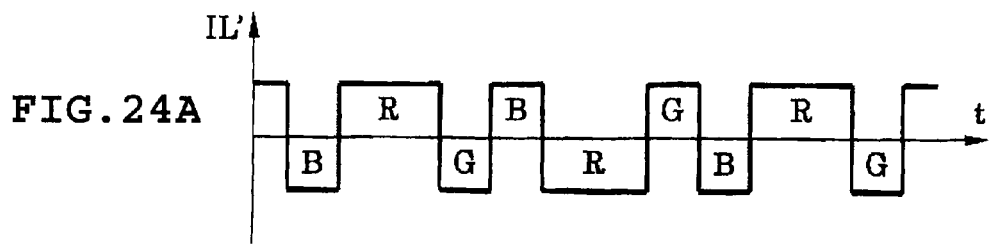
FIGS. 24A and 24B are schematic timing charts of a conventional discharge lamp lighting apparatus.
Figure 24B:
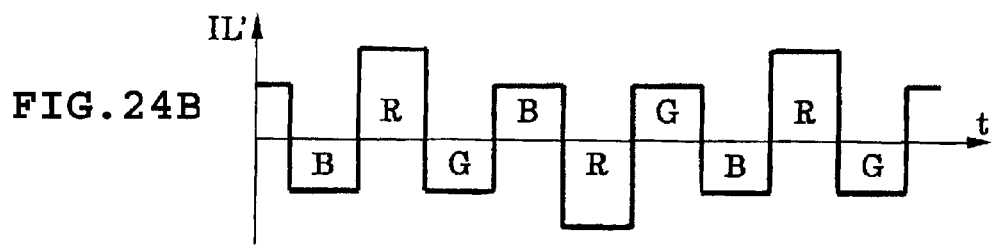

Moreover, for example, when the color wheel shown in FIG. 23A, or 23B is used as a dynamic color filter, the polarity reversal timing signal (So) is generated so as to be activated at time when the colors of the dynamic color filter are changed. As shown by a dashed line in FIG. 1, the embodiment may be applied to the discharge lamp lighting apparatus which is configured so that in the power supply circuit (Ux), periodic modulation on the lamp current which flows to the discharge lamp (Ld) may be carried out, synchronizing with the polarity reversal timing signal (So). In such a structure, when the polarity reversal timing signal (So) is activated similarly to the above structure, the inverter control circuit (Uf) has a basic operation in which inverter control signals (Sf1, Sf2) are generated so that the inverter (Ui) may immediately invert the polarity (after the dead time period which is mentioned below). The inverter control circuit (Uf) inserts (performs) intermittently the operation in which the successive pulse-like parts (whose number is odd) of the polarity-reversal operation based on the polarity reversal timing signal (So) are disregarded.

Figure 4:
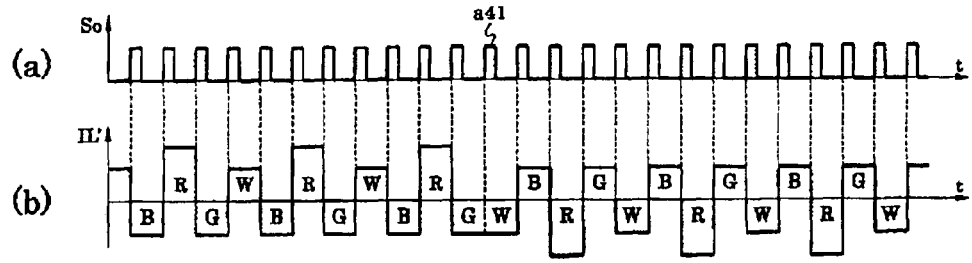
FIG. 4 is a schematic timing chart showing an embodiment of a discharge lamp lighting apparatus.
Figure 5:
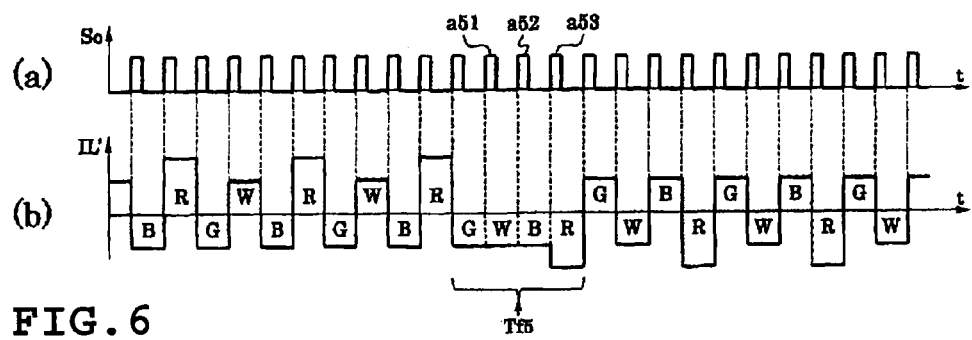
FIG. 5 is a schematic timing chart showing an embodiment of a discharge lamp lighting apparatus.

FIG. 4 shows a schematic timing chart of an embodiment. In the figure, one specific signal (a41) which is a part of the polarity reversal timing signal (So) is disregarded, so that the inverter (Ui) may not invert the polarity, even if this signal is received. Moreover, FIG. 5 shows a schematic timing chart of an embodiment In the figure, three specific parts (a51, a52, a53) of the polarity reversal timing signal (So) are disregarded, so that the inverter (Ui) may not invert the polarity, even if the signal is received. In addition, in these figures, (a) shows the polarity reversal timing signal (So), and (b) shows the lamp current (IL'), respectively.

Figure 25B:
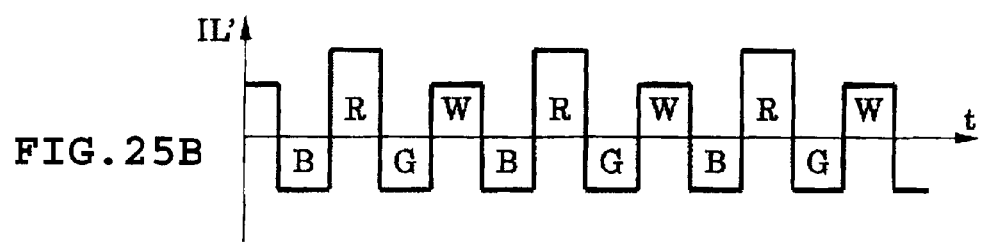

As compared with the waveform shown in FIG. 25B which is a schematic timing chart of lamp current (IL') in the conventional art, while in FIG. 25B, the polarity reversal phase (phases R) in which modulation is carried out to increase current, appears only when the lamp current (IL') is positive, in FIG. 4B or 5B, there are periods the polarity reversal phases (phases R) in which modulation is carried out to increase current, appears when the lamp current (IL') is positive, and also when it is negative. Since the positive and negative appearance periods are switched, every time an operation, in which successive pulse-like part(s) of a polarity-reversal operation based on the polarity reversal timing signal (So) is disregarded by odd number of time(s), is inserted intermittently, the problem of the unbalance of the thermal load in the two electrodes of the discharge lamp can be avoided by setting up the frequency of this intermittent insertion suitably.

Figure 6:
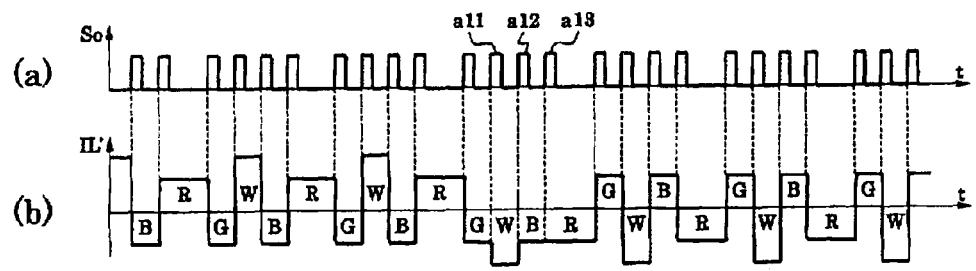
FIG. 6 is a schematic timing chart showing an embodiment of a discharge lamp lighting apparatus.
Figure 7:
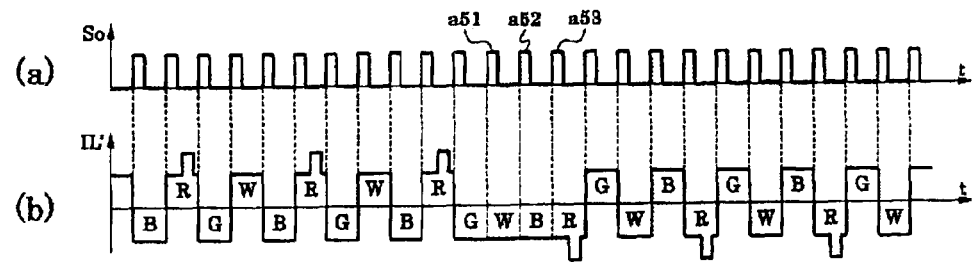
FIG. 7 is a schematic timing chart showing an embodiment of a discharge lamp lighting apparatus.

Although the case of the polarity-reversal phases (phases R) with the long period from polarity reversal to the following polarity reversal as in FIGS. 2 and 3 and the case of the polarity-reversal phase (phases R) in which the modulation is carried out to increase a current value as in FIGS. 4 and 5, are described above, it is possible to apply the embodiment to a case where there are polarity-reversal phases (for example, phases W) in which the modulation is carried out to increase a current value, and polarity-reversal phases (for example, phases R) with the long period from polarity reversal to the following polarity reversal, as in FIG. 6 which is a schematic timing chart of an embodiment. Moreover, as in FIGS. 4 and 5, in the case where there are polarity-reversal phases (phases R) in which the modulation is carried out to increase a current value, although it is described that modulation is carried out so that it may become one current level in a period from polarity reversal to the following polarity reversal, it is possible to apply the embodiment to a case where modulation with two or more current levels is carried out in a period from polarity reversal to the following polarity reversal, and a case where modulation with two or more complicated waveforms is carried out, as in FIG. 7, which shows a schematic timing chart of an embodiment.

In addition, since the degree of change of the lamp current by modulation or the degree of a change of a time length from polarity reversal to the following polarity reversal is infinite in variety, it is possible to experimentally suitably determine the frequency of the intermittent insertion operation in which the successive pulse-like parts of the polarity-reversal operation based on the polarity reversal timing signal (So) are disregarded by odd number of times. For example, a pair of electrodes of a discharge lamp (Ld), each of which has a projection at its tip is arranged at an interval of 2.0 mm or less so as to face each other. In case of a high-pressure mercury lamp in which mercury of 0.2 mg/mm$^3$ or more and halogen of $10^{-6}$ to $10^{-2}$ μmol/mm³ is enclosed, and a discharge lamp lighting apparatus according to the embodiment whose time interval from polarity reversal of an output to the following polarity reversal is 0.5-8.3 msec (milliseconds), when the successive pulse-like parts of the polarity-reversal operation based on the polarity reversal timing signal (So) are disregarded by odd number of times, the time interval of intermit insertion of the operation can be selected from the range of 10 milliseconds to 120 seconds.

Moreover, between the operation in which the successive pulse-like parts of the polarity-reversal operation based on the inserted polarity reversal timing signal (So) are disregarded by odd number of times, and the next operation in which the successive pulse-like parts of the polarity-reversal operation based on the polarity reversal timing signal (So) are disregarded by odd number of times, an operation in which the successive parts of the polarity-reversal operation based on the polarity reversal timing signal (So) is disregarded by even number of times may be inserted.

Figure 8:
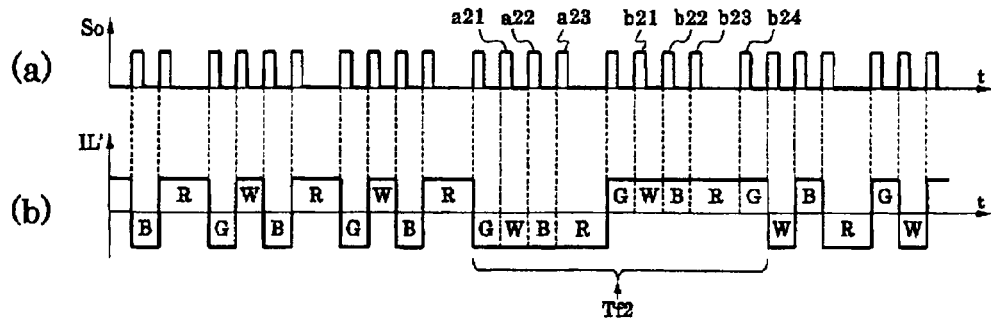
FIG. 8 is a schematic timing chart showing an embodiment of a discharge lamp lighting apparatus.
Figure 9:
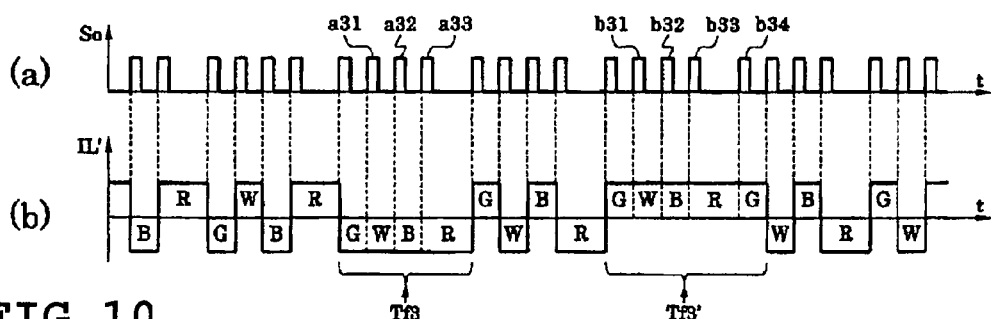
FIG. 9 is a schematic timing chart showing an embodiment of a discharge lamp lighting apparatus.

FIG. 8 shows an example of a timing chart of an embodiment. For example, in relation to FIG. 2, which is described above, in FIG. 8, three successive specific parts (a21, a22, a23) of the polarity reversal timing signal (So) are disregarded, so that even though these parts of the signal are received, the inverter (Ui) does not invert the polarity. Further, after one more part of the polarity reversal timing signal (So), four successive specific parts (b21, b22, b23, b24) are disregarded, so that even though these parts of signal are received, the inverter (Ui) may not invert the polarity. Moreover, FIG. 9 shows an example of a timing chart of the embodiment. For example, in relation to FIG. 3 which is described above, in FIG. 9, three successive specific parts (a31, a32, a33) of the polarity reversal timing signal (So) are disregarded, so that even though these parts of the signal are received, the inverter (Ui) does not invert the polarity. Further, after two or more parts of the polarity reversal timing signal (So), four successive specific parts (b31, b32, b33, b34) thereof are disregarded, so that even though these parts of the signal are received, the inverter (Ui) may not invert the polarity.

Figure 10:
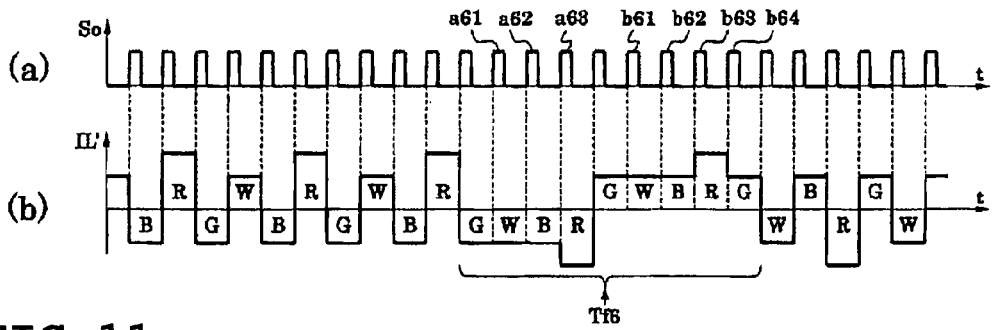
FIG. 10 is a schematic timing chart showing an embodiment of a discharge lamp lighting apparatus.
Figure 11:
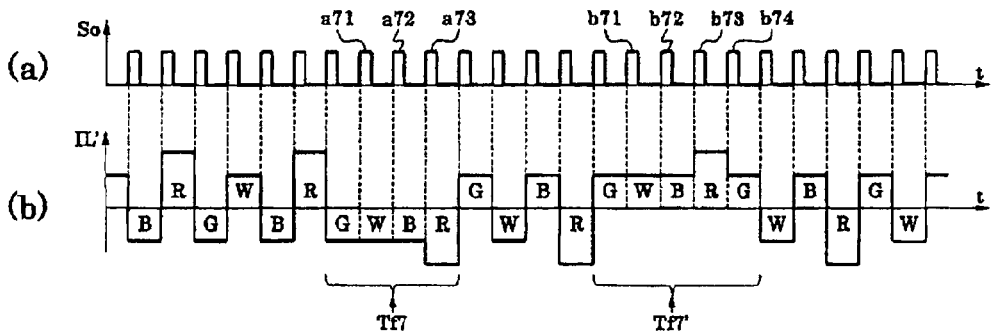
FIG. 11 is a schematic timing chart showing an embodiment of a discharge lamp lighting apparatus.

Furthermore, FIG. 10 shows a timing chart of the embodiment. In relation to FIG. 4 which is described above, in FIG. 10, three successive specific parts (a61, a62, a63) of the polarity reversal timing signal (So) are disregarded, and even if these signals are received, the inverter (Ui) does not invert the polarity. In addition, after one more part of polarity reversal timing signal (So), four successive specific signals (b61, b62, b63, b64) are disregarded, so that the inverter (Ui) may not invert the polarity, even if these parts of the signal are received. Moreover, FIG. 11 is a timing chart of the embodiment. In relation to FIG. 5, which described above, three successive specific parts (a71, a72, a73) of the polarity reversal timing signal (So) are disregarded, so that the inverter (Ui) does not invert the polarity even if these signals are received. In addition, after two or more parts of the polarity reversal timing signals (So), four successive specific parts (b71, b72, b73, b74) of the signal are disregarded, so that the inverter (Ui) may not invert the polarity, even if these parts of the signal are received. In addition, in these figures, (a) shows the polarity reversal timing signal (So), and (b) shows the lamp current (IL'), respectively.

In FIGS. 8 and 9, there is a polarity reversal phases with the long time length from polarity reversal to the following polarity reversal (phases R). Moreover, in FIGS. 10 and 11, there are a period in which the polarity reversal phase (phases R) during which current increase modulation is carried out appears when the lamp current (IL') is positive, and a period in which the polarity reversal phase during which current increase modulation is carried out appears when lamp current (IL') is negative. And these appearance periods are switched by turns every time the operation in which the successive pulse-like parts of the polarity reversal operation based on the polarity reversal timing signal (So) are disregarded by odd number of times, is intermittently inserted. Therefore, by setting the frequency of this intermittent insertion suitably, it is possible to solve the problem that the above-mentioned unbalance of the thermal load in the two electrodes of the discharge lamp, occurs.

In addition, by inserting an operation in which parts of the polarity reversal operation based on the polarity reversal timing signal (So) are disregarded by even number of times in the polarity-reversal phases (phases R) with the long period from polarity reversal to the following polarity reversal or the polarity reversal phases in which the current increase modulation is carried out (phases R), these states of appearance are not switched even where the lamp current (IL') is positive or the lamp current (IL') is negative. However, for example, that is useful in case where one cycle at a low frequency is inserted (as shown in FIG. 4 of Japanese Laid Open Patent No. 2006-59790) or in case where a half cycle ((a) of FIG. 6 of Japanese Laid Open Patent No. 2006-59790) is inserted.

That is, in FIG. 8, a period (Tf2) during which the polarity reversal does not take place, may be generated by disregarding the specific parts (a21, a22, a23) of the signal and the specific parts (b21, b22, b23, b24) of the polarity reversal timing signal (So), so that the period (Tf2) can be used as one cycle at the low frequency to be inserted. Moreover, in FIG. 9, a period (Tf3) during which the polarity reversal does not take place, is generated by disregarding the specific parts (a31, a32, a33) of the polarity reversal timing signal (So), so that the period (Tf3) can be used as one half cycle at the low frequency to be inserted. Moreover, a period (Tf3') during which the polarity reversal does not take place, is generated by disregarding the specific parts (b31, b32, b33, b34) of the signal, so that the period (Tf3') can be used as the other half cycle at the low frequency to be inserted.

Furthermore, in FIG. 10, a period (Tf6) during which the polarity reversal does not take place, may be generated by disregarding the specific parts (a61, a62, a63) and the specific parts (b61, b62, b63, b64) of the polarity reversal timing signal (So), so that the period (Tf6) can be used as the one cycle at the low frequency to be inserted. Moreover, in FIG. 11, a period (Tf7) during which the polarity reversal does not take place, may be generated by disregarding the specific parts (a71, a72, a73) of the polarity reversal timing signal (So), so that the period (Tf3) can be used as one half cycle at the low frequency to be inserted, and a period (Tf7') during which the polarity reversal does not take place, may be generated by disregarding the specific parts (b71, b72, b73, b74) of the polarity reversal timing signal (So), so that the period (Tf7') can be used as the other half cycle at the low frequency to be inserted.

In addition, a period (Tf1) during which the polarity reversal does not take place, is formed by disregarding the successive specific parts (a11, a12, a13) of the polarity reversal timing signal (So) by odd number of times, can be used as one half cycle at the low frequency to be inserted, and similarly, the polarity in a period formed next time, during which the polarity reversal does not take place, is reversed from that in the period (Tf1) so that it can be used as the other half cycle of the low frequency to be inserted. In addition, in FIG. 5, a period (Tf5) during which the polarity reversal does not take place, may be generated by disregarding the successive specific parts (a51, a52, a53) of the polarity reversal timing signal (So) by odd number of times, so that the period (Tf5) can be used as one half cycle at the low frequency to be inserted. Similarly, the polarity in the next period, during which the polarity reversal does not take place, is reversed from that in the period (Tf5) so that it can be used as the other half cycle at the low frequency to be inserted. By doing so, even if an operation in which the parts of the polarity-reversal operation based on the polarity reversal timing signal (So) are disregarded by even number of times is not inserted, it is possible to realize it, if the one half and the other half of the low frequency are apart time wise, even in the technology described in Japanese Laid Open Patent No. 2006-59790.

As can be understood easily from FIGS. 8, and 9, etc. and the above description, if the number of times of the polarity reversals in a period which separates the periods (Tf1, Tf2, Tf3, Tf3', Tf5, Tf6 and Tf7, Tf7') during which the polarity reversal does not take place and which are formed by the operation in which a successive pulse-like parts of the polarity reversal operation based on the polarity reversal timing signal (So) are disregarded by odd number of times or successive parts of the polarity reversal operation based on the polarity reversal timing signal (So) are disregarded by even number of times, is odd, the polarity of the lamp current (IL') in a period during which polarity reversal does not take place, alternatively becomes positive, and negative. On the contrary, when the number of times of the polarity reversals in a period which separates the periods during which the polarity reversal does not take place is even, reversal of the polarity of the lamp current (IL') in a period does not take place, so that the same polarity is repeated. Therefore, from the viewpoint of the balance of the thermal load of the electrodes, as to the number of times of the polarity reversals in a period which separates the periods during which the polarity reversal does not take place, it is desirable to insert, an odd number operation at a suitable frequency, for example, an operation under the condition where the number thereof is odd every time, or an operation in which the number thereof is odd and an operation in which the number thereof is even are repeated by turns.

In addition, when applying the technology described in Japanese Laid Open Patent No. 2006-59790 which is described above, as can understand easily from the Japanese Laid Open Patent, for example, a pair of electrodes of a discharge lamp (Ld), each of which has a projection at its tip is arranged at an interval of 2.0 mm or less so as to face each other. In case of a high-pressure mercury lamp in which mercury of 0.2 mg/mm$^3$ or more and halogen of $10^{-6}$ to $10^{-2}$ µmol/mm$^3$ is enclosed, and a discharge lamp lighting apparatus according to the embodiment whose time interval from polarity reversal of an output to the following polarity reversal is 0.5 to 8.3 msec (milliseconds), the period (Tf1, Tf2, Tf3, Tf3', Tf5, Tf6 and Tf7, Tf7') during which the polarity reversal does not take place, and which is formed by the operation in which the successive pulse-like parts of the polarity reversal operation based on the polarity reversal timing signal (So) is disregarded by odd number of times or even number of times, may be selected from a range of 2.5 to 100 milliseconds, and the time interval in case of intermittently inserting the disregarding operation is selected from a range of 10 milliseconds to 120 seconds.

Figure 12:
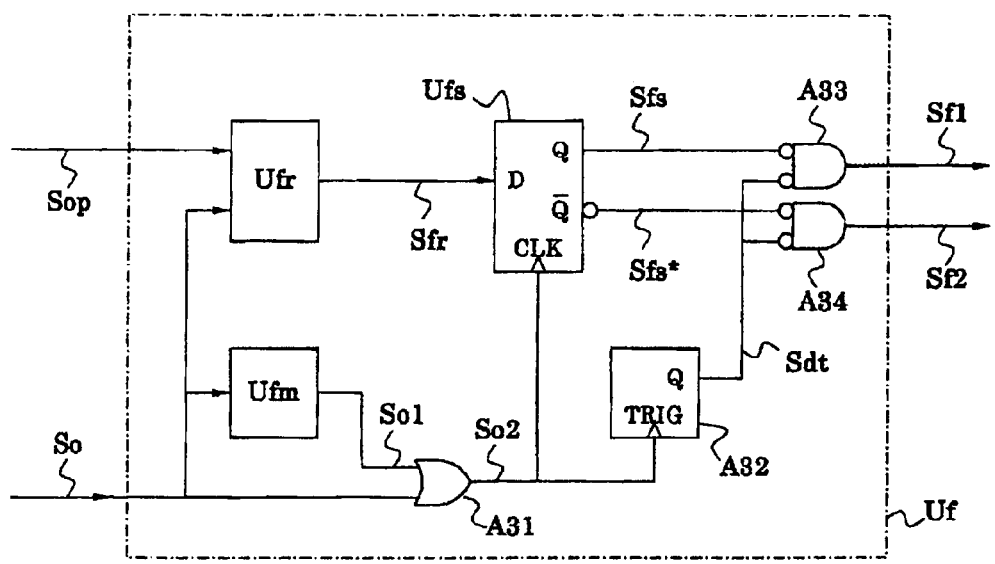
FIG. 12 is a schematic view of part of a discharge lamp lighting apparatus according.

FIG. 12 is a schematic diagram showing the structure of the inverter control circuit (Uf). The inverter control circuit (Uf) has an inverter polarity register (Ufs) which is formed by using a D flip-flop, for holding an inverter polarity signal (Sfs) which is a bit signal corresponding to the polar state of the inverter (Ui). The inverter control signals (Sf1, Sf2) shown in FIG. 1 are generated based on the inverter polarity signal (Sfs) and an inverter polarity signal logic inversion signal (Sfs*) which is a logic inversion of the inverter polarity signal. However, a polarity reversal timing signal (So2) which is a clock signal of the inverter polarity register (Ufs) is inputted into a monostable multivibrator (A32), in order to insert the above-mentioned dead time period. The monostable multivibrator (A32) generates a dead time signal (Sdt) having a constant time length, in response to the leading edge of an input signal. Since the inverter polarity signal (Sfs) and an inverter polarity signal logic inversion signal (Sfs*) are inputted into NOR logical gates (A33, A34) and the dead time signal (Sdt) is inputted into each of them, so that the inverter control signals (Sf1, Sf2) which are separated from each other are generated by the dead time period.

An original inverter polarity signal (Sfr) generated in the original inverter polarity signal generation circuit (Ufr) is inputted into the inverter polarity register (Ufs). Since the polarity reversal timing signal (So) is inputted into the original inverter polarity signal generation circuit (Ufr), the original inverter polarity signal generation circuit (Ufr) can generate the original inverter polarity signal (Sfr) according to the history of the polarity reversal timing signal (So).

A polarity reversal timing signal (So2) which is approximately equivalent to the polarity reversal timing signal (So) is inputted into the inverter polarity register (Ufs) as a data setting clock pulse. For this reason, when the polarity reversal timing signal (So) is received, the inverter control circuit (Uf) holds the value of the original inverter polarity signal (Sfr) which has been inputted by the time immediately before the polarity reversal timing signal (So) is received, and outputs the value as the inverter polarity signal (Sfs). Therefore, the original inverter polarity signal (Sfr) which is determined when the original inverter polarity signal generation circuit (Ufr) receives the polarity reversal timing signal (So) is set in the inverter control circuit (Uf) as the inverter polarity signal (Sfs) when the polarity reversal timing signal (So) is received next time. After all, it turns out that this circuit can control the polarity-reversal operation of the inverter (Ui) based on the history of the polarity reversal timing signal (So).

By the way, the polarity reversal timing signal (So2) is generated by combining the polarity reversal timing signal (So) and the polarity reversal timing compliment signal (So1) generated in a timing signal complement circuit (Ufm) in an OR gate (A31). When the polarity reversal timing signal (So) which should be transmitted from an image processing section of a projector is lost, since the lamp for alternating current lighting is turned on by direct current whereby the lamp is damaged. Therefore, the timing-signal complement circuit (Ufm) checks continuously whether the polarity reversal timing signal (So) is inputted as a pulse signal which has a proper time interval. If the pulse signal is not inputted, the polarity-reversal timing compliment signal (So1) is outputted as a substitution signal, in order to avoid the direct current lighting of the lamp. In addition, the OR gate (A31) may be used as a data selector which chooses either the polarity reversal timing signal (So) or the polarity-reversals timing compliment signal (So1).

As long as the polarity reversal timing signal (So) is inputted normally, since the inverter polarity signal (Sfs) is renewed by the inverter polarity register (Ufs), synchronizing with the polarity reversal timing signal (So), significant delay from reception of the polarity reversal timing signal (So) or jitter does not occur. Therefore, since the original inverter polarity signal generation circuit (Ufr) or the timing-signal complement circuit (Ufm) does not require a high-speed operation, a microprocessor can be used therefor. Thus, there is an advantage that any number of complicated functions can be added to the original inverter polarity signal generation circuit (Ufr) without a complicated circuit arrangement, when the original inverter polarity signal generation circuit (Ufr) is configured using a microprocessor.

In the original inverter polarity signal generation circuit (Ufr), the intermittent insertion of the operation in which the successive pulse-like parts of a polarity reversal operation based on the polarity reversal timing signal (So) are disregarded by odd number of times, can be easily realized, according to the count value of the polarity reversal timing signal (So) which is an input signal. That is, the original inverter polarity signal (Sfr) for reversal is generated, every time the polarity reversal timing signal (So) is received, until the count value of the polarity reversal timing signal (So) turns into a first predetermined count value. If the count value of the polarity reversal timing signal (So) turns into the first predetermined count value, the count value of the polarity reversal timing signal (So) is cleared, and until the count value of the polarity reversal timing signal (So) turns into a second predetermined count value, the reversal operation of the original inverter polarity signal (Sfr) is stopped. If the count value of the polarity reversal timing signal (So) turns into the second predetermined count value, the count value of the polarity reversal timing signal (So) is cleared. And the sequence may be configured so as to return to a state of waiting for the count value of the polarity reversal timing signal (So) turning into the first predetermined count value, while original inverter polarity signal (Sfr) which is reversed every time the polarity reversal timing signal (So) is received, is generated.

Here, the first predetermined count value corresponds to the number of parts of the polarity reversal timing signal (So) in a period between the inserted operation in which pulse-like parts of the polarity reversal operation based on the polarity reversal timing signal (So) are disregarded by odd number of times and the next inserted operation in which pulse-like parts of the polarity reversal operation based on the polarity reversal timing signal (So) is disregarded by odd number of times. The second predetermined count value corresponds to the number of the successive parts of the disregarded polarity reversal timing signal (So), whose number of times is odd.

In addition to the intermittently inserted operation in which the pulse-like parts of the polarity reversal operation based on the polarity reversal timing signal (So) are disregarded by odd number of times, in order to realize an operation in which parts of the polarity reversal operation based on the polarity reversal timing signal (So) is disregarded by even number of times, the operation may be carried out based on first, second, third and forth predetermined count values, similarly to the operation based on the first and second count values. That is, until the count value of the polarity reversal timing signal (So) turns into the first predetermined count value, the original inverter polarity signal (Sfr) which is reversed every time the polarity reversal timing signal (So) is received, is generated. If the count value of the polarity reversal timing signal (So) turns into the first predetermined count value, the count value of the polarity reversal timing signal (So) is cleared, and the reversal operation of the original inverter polarity signal (Sfr) is stopped until the count value of the polarity reversal timing signal (So) turns into the second predetermined count value. If the count value of the polarity reversal timing signal (So) turns into the second predetermined count value, the count value of the polarity reversal timing signal (So) is cleared, and the original inverter polarity signal (Sfr) which is reversed every time the polarity reversal timing signal (So) is received, is generated until the count value of the polarity reversal timing signal (So) turns into the third predetermined count value. If the count value of the polarity reversal timing signal (So) turns into the third predetermined count value, the count value of the polarity reversal timing signal (So) is cleared, the reversal operation of the original inverter polarity signal (Sfr) is stopped until the count value of the polarity reversal timing signal (So) turns into the fourth predetermined count value. If the count value of the polarity reversal timing signal (So) turns into the fourth predetermined count value, the count value of the polarity reversal timing signal (So) is cleared, and the above-mentioned sequence may be configured so as to return to a state of waiting for the count value of the polarity reversal timing signal (So) turning into the first predetermined count value, while original inverter polarity signal (Sfr) which is reversed every time the polarity reversal timing signal (So) is received, is generated.

Here, the first predetermined count value corresponds to the number of parts of the polarity reversal timing signal (So) in a period between the inserted operation in which the parts of the polarity reversal operation based on the polarity reversal timing signal (So) is disregarded by even number of times and the next inserted operation in which the pulse-like parts of the polarity reversal operation based on the polarity reversal timing signal (So) are disregarded by odd number of times. The second predetermined count value corresponds to the number of parts of the disregarded successive pulse-like parts of the polarity reversal timing signal (So), whose number of times is odd. The third predetermined count value corresponds to the number of parts of the polarity reversal timing signal (So) in a period between the inserted operation in which the pulse-like parts of the polarity reversal operation based on the polarity reversal timing signal (So) are disregarded by odd number of times and the next inserted operation in which the parts of the polarity reversal operation based on the polarity reversal timing signal (So) is disregarded by even number of times. The fourth predetermined count value corresponds to the number of parts of the successive parts of the polarity reversal timing signal (So) to be disregarded by even number of times.

Moreover, a modulation cycle initialization signal (Sop) is also inputted into the original inverter polarity signal generation circuit (Ufr) if needed. For example, the original inverter polarity signal generation circuit (Ufr) has a phase track holding structure which is the same as that for a count value Nkc inside thereof. By the count value of the polarity reversal timing signal (So), the information of a color which appears on the dynamic color filter at that time can be tracked. And based on this color information if needed, it is possible to configure the structure so as to determine whether the polarity should be maintained or the polarity should be reversed, thereby determining and outputting a new original inverter polarity signal (Sfr).

Figure 13:
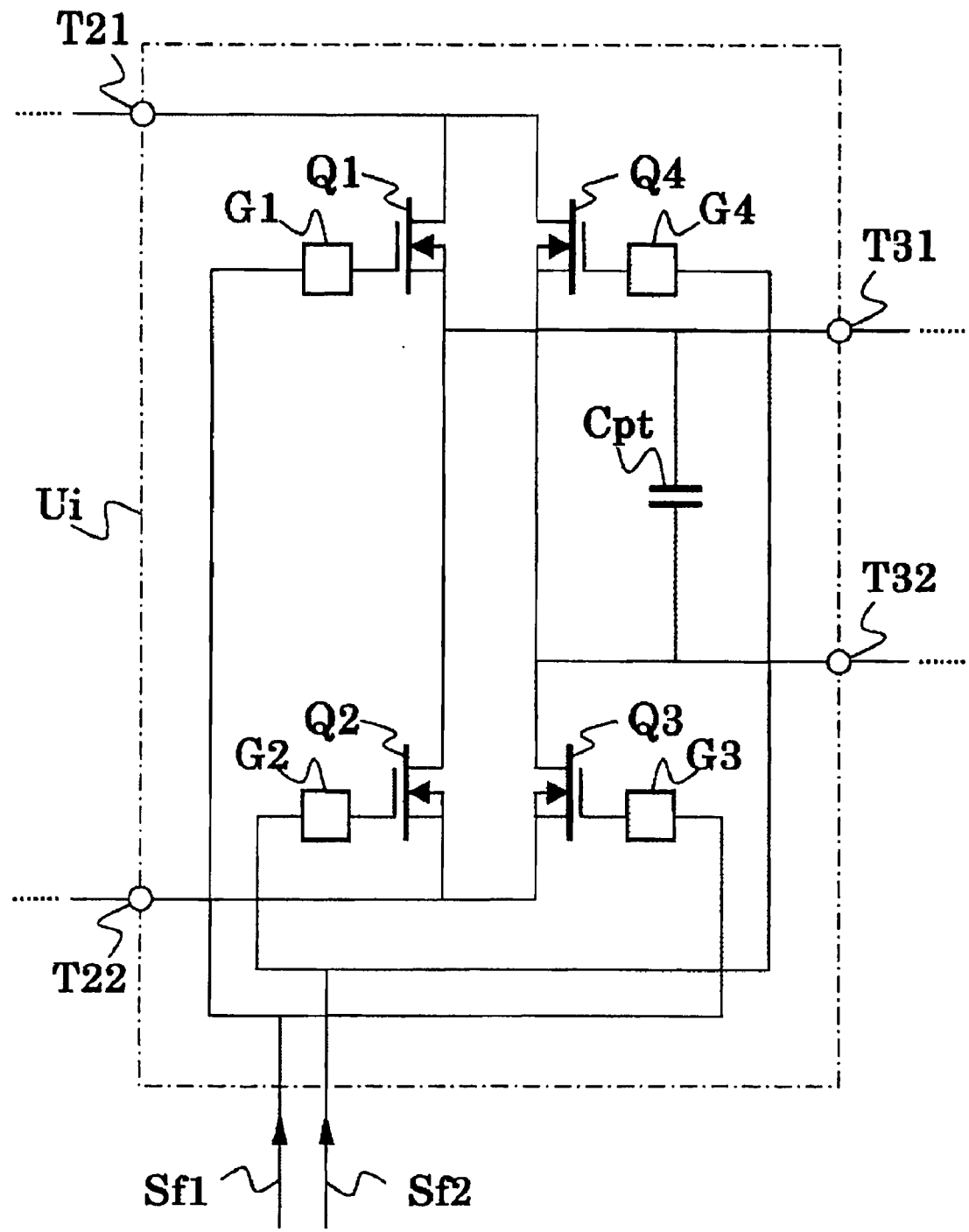
FIG. 13 is a schematic view of part of a discharge lamp lighting apparatus according to an embodiment.

FIG. 13 shows a schematic view of an example of the inverter (Ui) which can be used with a discharge lamp lighting apparatus according to the embodiment. The inverter (Ui) is made up of a full bridge circuit having switching elements (Q1, Q2, Q3, Q4), such as FETs, etc. Each switching element (Q1, Q2, Q3, Q4) is driven by each gate driving circuit (G1, G2, G3, G4), and with regard to the gate driving circuit (G1, G2, G3, G4), when the switching element (Q1) and the switching element (Q3) which are in a relationship of diagonal elements are in an ON state, the switching element (Q2) and the switching element (Q4) which are in relationship of diagonal elements are maintained in an OFF state. Conversely, the switching element (Q2) and the switching element (Q4) which are in relationship of diagonal elements are in an ON state, the switching element (Q1) and switching element (Q3) are controlled by the inverter control signals (Sf1, Sf2) generated by the inverter control circuit (Uf) so that the switching element (Q1) and the switching element (Q3)

are in an OFF state. When the two above-mentioned phases are switched, a period which is called a dead time is inserted. In the dead time, all the switching elements (Q1, Q2, Q3, Q4) are turned off.

In addition, in case where the switching elements (Q1, Q2, Q3, Q4) is MOSFETs, a parasitism diode whose forward direction is from a source terminal toward a drain terminal is built in the element itself (not shown). However, in case where a bipolar transistor in which a parasitism diode like does not exist, is used therefor, since there is a possibility that the element may be damaged by generation of reverse voltage at the above-mentioned switching time or during the dead time, when the induced current resulting from the inductance component which exists in the downstream side of the inverter (Ui) will flow, it is desirable to connect a diode equivalent to a parasitism diode in reverse-parallel. In addition, a capacitor (Cpt) is may be installed, when protecting the switching elements (Q1, Q2, Q3, Q4) from surge voltage etc.

Figure 14:
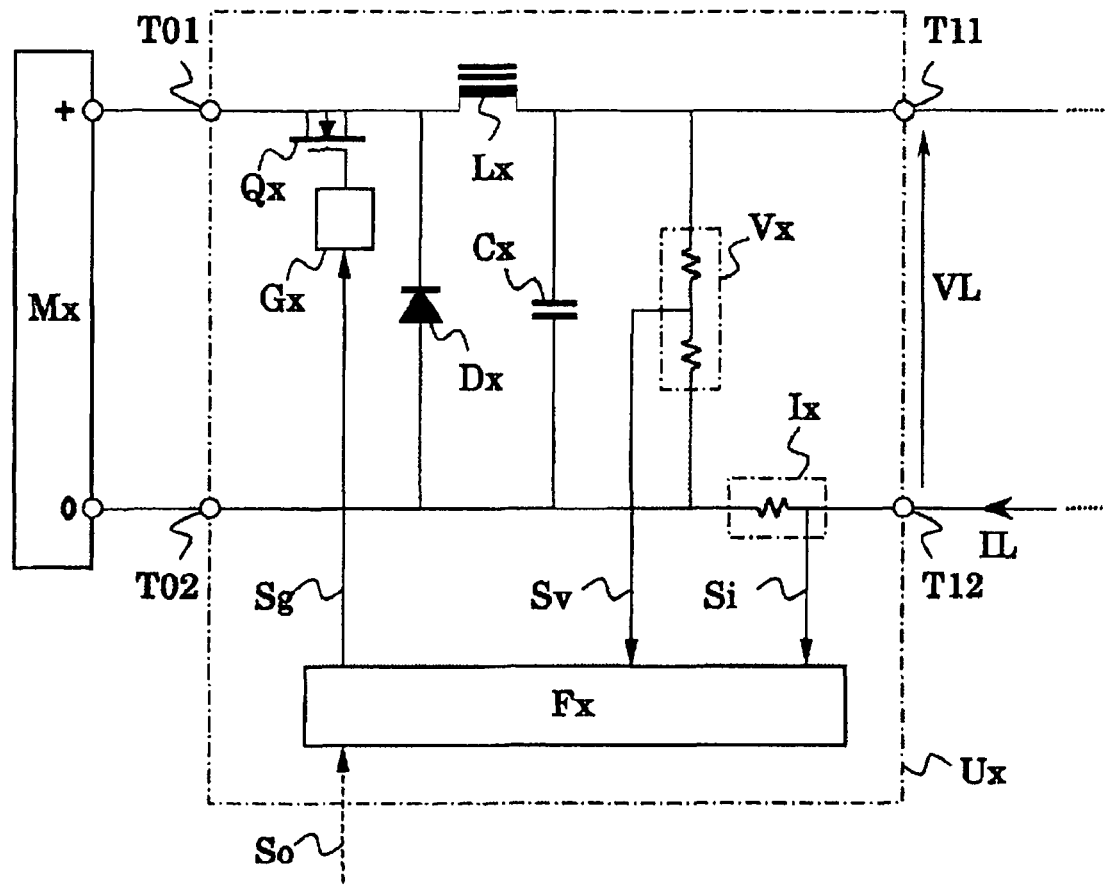
FIG. 14 is a schematic view of part of a discharge lamp lighting apparatus according to an embodiment.

FIG. 14 shows an example of the power supply circuit (Ux) which can be used with a discharge lamp lighting apparatus according to the embodiment. The power supply circuit (Ux) which is basically formed of a step down chopper circuit is operated in response to supply of voltage from a DC power source (Mx), such as a PFC, so that electric power supply to a discharge lamp (Ld) is adjusted. In the power supply circuit (Ux), current from the DC power source (Mx) is turned on and off by a switching element (Qx) such as FET, and a smoothing capacitor (Cx) is charged through a choke coil (Lx). This voltage is impressed to the discharge lamp (Ld), so that current can be passed to the discharge lamp (Ld).

In addition, when the switching element (Qx) is in an ON state, while the smoothing capacitor (Cx) is directly changed and current is supplied to the discharge lamp (Ld) which is load, by the current which flows through the switching element (Qx), energy is stored in the choke coil (Lx) in form of magnetic flux. When the switching element (Qx) is in an OFF state, the smoothing capacitor (Cx) is charged through a flywheel diode (Dx) and current is supplied to the discharge lamp (Ld) by energy stored in the choke coil (Lx) in the form of magnetic flux.

In the step down chopper type power supply circuit (Ux), electric power supplied to the discharge lamp can be adjusted by the ratio of the period of an ON state of the switching element (Qx) to an operation cycle of the switching element (Qx), that is, a duty cycle ratio. Here, the gate driving signal (Sg) which has a certain duty cycle ratio is generated by an electric supply control circuit (Fx), and turning on and off the current from the DC power source (Mx) is controlled by controlling the gate terminal of the switching element (Qx) through a gate driving circuit (Gx).

Lamp current (absolute value) which flows between the electrodes (E1, E2) of the discharge lamp (Ld), and lamp voltage (absolute value) generated between electrodes (E1, E2) are detected by a lamp current detection unit (Ix) and a lamp voltage detection unit (Vx), respectively. In addition, the lamp current detection unit (Ix) may be formed by using a shunt resistor, and the lamp voltage detection (Vx) may be easily formed by using a voltage dividing resistor.

The lamp current detection signal (Si) obtained from the lamp current detection unit (Ix) and the lamp voltage detection signal (Sv) obtained from the lamp voltage detection unit (Vx) are inputted into the electric supply control circuit (Fx). The electric supply control circuit (Fx) a gate driving signal (Sg) in a feedback manner in a period when the lamp current does not flow at the time of lamp start-up, so that predetermined voltage may be outputted, in order to impress a no-load open circuit voltage to the lamp. When the lamp is initialed and the discharge current flows, the gate driving signal (Sg) is generated in a feedback manner so that target lamp current may be outputted. The target lamp current depends on the voltage of the discharge lamp (Ld), and is based on a value according to which the electric power supplied to the discharge lamp (Ld) turns into predetermined electric power. However, since the voltage of the discharge lamp (Ld) is low immediately after start-up so that rated power cannot be supplied, the target lamp current is controlled not to exceed a fixed limit value which is called an initial limit current. And if the voltage of the discharge lamp (Ld) rises with a temperature rise, and current required for a predetermined electric power turns into below the initial limit current, it smoothly shifts to the state where the above-mentioned predetermined electric power is realizable.

In addition, although the step down chopper circuit is shown as the power supply circuit (Ux), a converter for converting input electric power into voltage/current suitable for supplying electric power to the discharge lamp, for example, a step up chopper circuit etc. can be used. The form of the power supply circuit is not the essence of the present invention.

Figure 15:
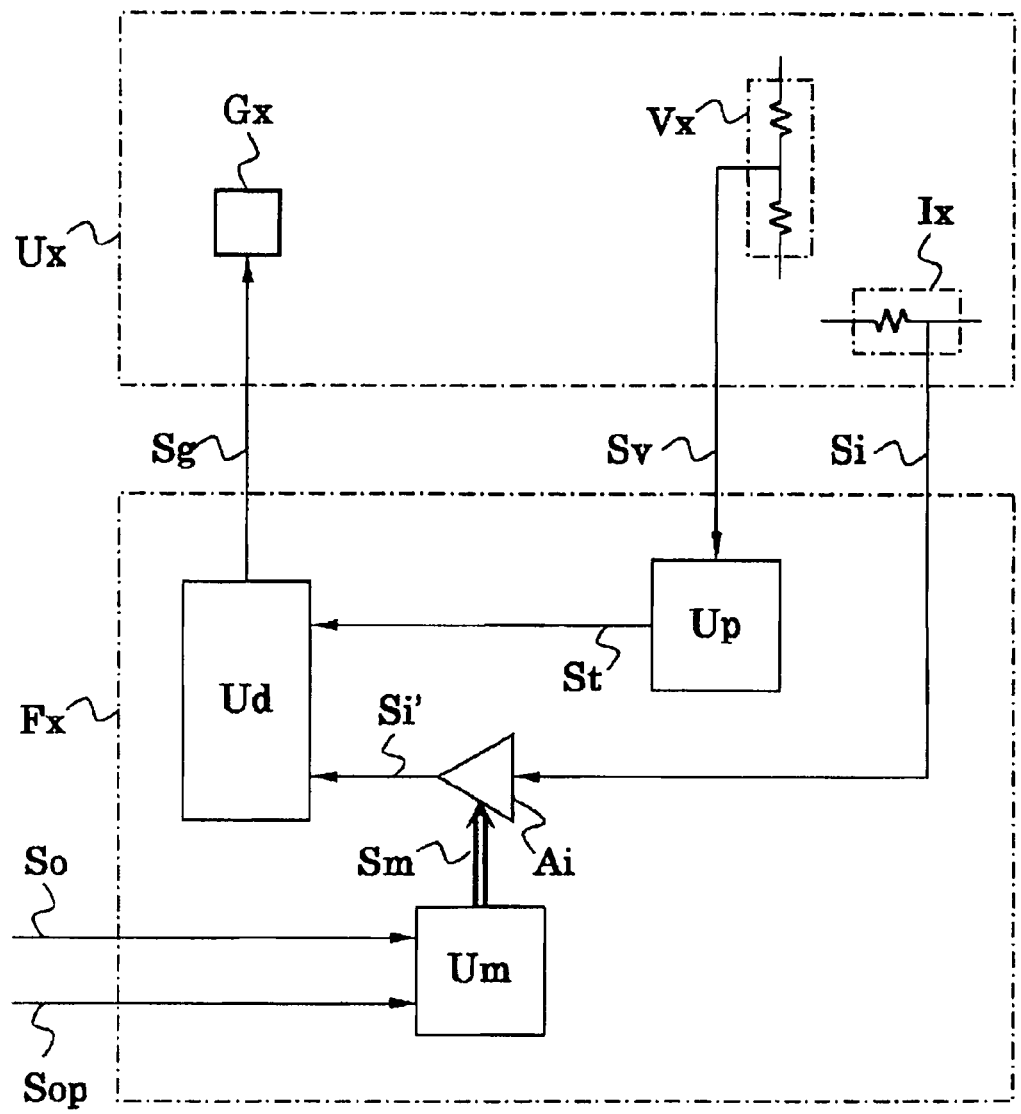
FIG. 15 is a schematic block diagram of an embodiment of a discharge lamp lighting apparatus.

FIG. 15 is a schematic block diagram showing an electric supply control circuit (Fx). The lamp current detection signal (Si) is converted into a conversion lamp current detection signal (Si') by a lamp current detection signal converter (Ai) which is formed of an amplifier in which the gain is variable or an attenuator in which the gain is variable, with respect to the lamp current detection signal (Si). A lamp current modulation circuit (Um) generates a modulation signal (Sm), and according to this modulation signal (Sm), modulation is carried out on the gain of the lamp current detection signal converter (Ai). The conversion lamp current detection signal (Si') and the lamp current target signal (St) which is a control target value of the signal (Si') are inputted into a power supply capacity control circuit (Ud), so that the power supply capacity control circuit (Ud) compares these two signals with each other.

And when the value of the conversion lamp current detection signal (Si') is smaller than that of the lamp current target signal (St), feedback control of the output of the gate driving signal (Sg) to the power supply circuit (Ux) is carried out, so that the lamp current (IL) may increase, and conversely, when the value of the conversion lamp current detection signal (Si') is larger than the lamp current target signal (St), feedback control of the output of the gate driving signal (Sg) to the power supply circuit (Ux) is carried out so that the lamp current (IL) may decrease, whereby the conversion lamp current detection signal (Si') and the lamp current target signal (St) are in agreement. Moreover, in the modulation of lamp current, for example, when the modulation signal (Sm) is changed and the gain of the lamp current detection signal converter (Ai) decreases in a state where the conversion lamp current detection signal (Si') and the lamp current target signal (St) are in agreement so that feedback control is attained, the power supply capacity control circuit (Ud) determines that the value of the conversion lamp current detection signal (Si') is too small, so that the output of the gate driving signal (Sg) is controlled so as to increase the lamp current (IL). The modulation function of the lamp current according to the modulation signal (Sm) is realized by such an operation.

On the other hand, a lamp voltage detection signal (Sv) is inputted into an electric power control circuit (Up). The electric power control circuit (Up) has a function which updates the lamp current target signal (St) so that a load electric power value PL supplied to the discharge lamp (Ld) may turn into a predetermined target electric power value PT by using a lamp voltage detection signal (Sv). Thus, since the electric supply control circuit (Fx) is configured in such a manner, the discharge lamp lighting apparatus can carry out modulation on lamp current according to the modulation signal (Sm), while starting the discharge lamp (Ld), and maintaining electric discharge with predetermined electric power.

In addition, the structure of an example of the electric power control circuit (Up) will be described below. The lamp voltage detection signal (Sv) is inputted into an A-D converter provided in the electric power control circuit (Up), and is converted into the digital lamp voltage data which have a suitable number of digits, so as to input it into a microprocessor unit. Here, the microprocessor unit includes an IO controller for inputs and outputs of a CPU, a program memory, a data memory, a clock pulse generating circuit, a time counter, and a digital signal etc. The microprocessor unit generates original lamp current target data based on the conditional judgments according to calculation referred to the lamp voltage data, or the state of the system at the time. For example, the value of the lamp current (IL) for attaining rated power is calculated by dividing the constant corresponding to the rated power by the lamp voltage data, and the original lamp current target data is generated as data corresponding to this value. However, as is generated immediately after start-up, on the conditions on which the acquired calculation value which is obtained by the division exceeds a value equivalent to the maximum value ILmax of the lamp current (IL), a value which is equivalent to the maximum value ILmax is set up as the original lamp current target data, instead of the calculation value. The original lamp current target data is converted into the analog lamp current target signal (St) by a digital-to-analog converter.

Although the lamp current modulation circuit (Um) generates the modulation signal (Sm) synchronizing with the polarity reversal timing signal (So), since the information for specifying that each part of the received polarity reversal timing signal (So) corresponds to which phase in one cycle is required, a modulation cycle initialization signal (Sop) is inputted. For example, when a color wheel shown in FIG. 23A or FIG. 23B is used as a dynamic color filter, and when the number of parts of the polarity reversal timing signal (So) in one cycle is four (4), a polarity reversal phase track counter (Ukc) for tracking and holding a polarity reversal phase which has 0, 1, 2, and 3 as a count value Nkc is at least provided, wherein every time the polarity reversal timing signal (So) is activated, the count value Nkc of the polarity reversal phase track counter (Ukc) is updated.

However, when the modulation cycle initialization signal (Sop) is received, the count value Nkc is initialized so as to be set as, for example, zero (0).

The lamp current modulation circuit (Um) is configured so that the modulation signal (Sm) may be generated according to the count value Nkc of the polarity reversal phase track counter (Ukc). For example, 0, 1, 2, and 3 of the count value Nkc are made to correspond to B, R, G, and W of the color of a color wheel, respectively. When the count value Nkc is 0, 1, 2, and 3, the values of the modulation signal (Sm) suitable for B, R, G and W respectively are generated.

Figure 16:
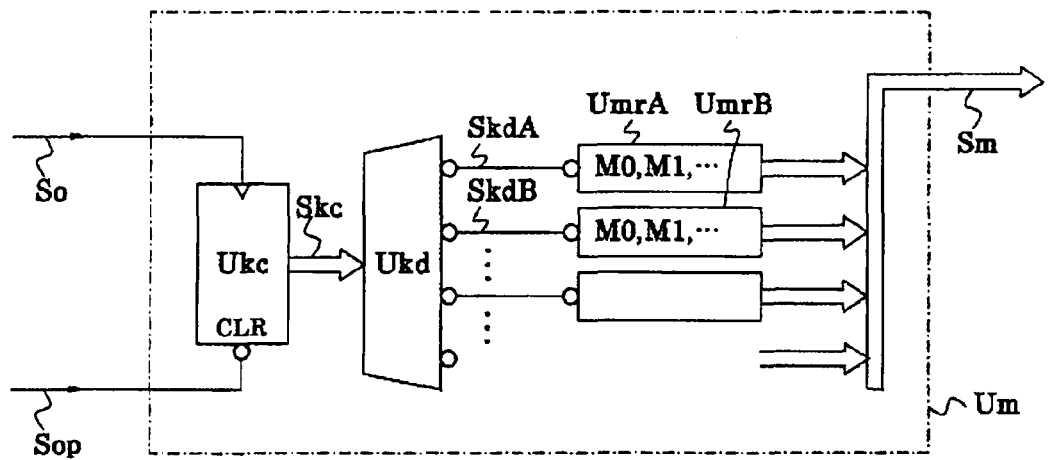
FIG. 16 is a schematic view of part of a discharge lamp lighting apparatus according to an embodiment.

Such a lamp current modulation circuit (Um) can be configured by using a commercially available general purpose IC etc. FIG. 16 is a schematic block diagram showing the lamp current modulation circuit (Um). For example, a general purpose hexadecimal digital counter is used as the polarity reversal phase track counter (Ukc), in which the polarity reversal timing signal (So) and the modulation cycle initialization signal (Sop) are inputted into a clock signal input terminal and a clear signal input terminal, respectively. The count output signal (Skc) corresponding to the count value Nkc of the polarity reversal phase track counter (Ukc) is inputted into a decoder (Ukd) which a general purpose IC. A decoding signal (SkdA, SkdB, - - - ) corresponding to the respective count values Nkc is outputted from the decoder (Ukd). Registers (UmrA, UmrB, - - - ) which are made up of a general-purpose IC(s) having, for example, a tristate output are connected to respective signal lines of the decoding signal (SkdA, SkdB, - - - ). And the values of the modulation signal (Sm) corresponding to the count value Nkc are stored in the respective registers (UmrA, UmrB, - - - ).

In such an lamp current modulation circuit (Um), after the modulation cycle initialization signal (Sop) is activated and then the polarity reversal phase track counter (Ukc) is initialized, every time the polarity reversal timing signal (So) is activated, the count value Nkc of the polarity reversal phase track counter (Ukc) is incremented. One of the registers (UmrA, UmrB, - - - ) corresponding to the count value Nkc is selected by the decoder (Ukd), and the data currently held at the connected registers (UmrA, UmrB, - - - ) is outputted as the modulation signal (Sm). Functions and an operation of the lamp current modulation circuit (Um), as described above, can be suitably configured by software and a microprocessor, instead of using a general purpose IC etc.

In addition, in FIG. 15, the lamp current modulation circuit (Um) is provided in the discharge lamp lighting apparatus, so that the modulation signal (Sm) may be generated by the discharge lamp lighting apparatus. However, the modulation signal (Sm) may be generated by an image processing circuit section of a projector main body which collaborates with this discharge lamp lighting apparatus. The generation origin of the modulation signal (Sm) is not the essence of the present invention. Moreover, the modulation signal (Sm) may be a 1-bit binary signal which has high level and low level, data with gradation which consists of a multi-bit digital signal, or even an analog signal, as long as the lamp current modulation circuit (Um) is provided so as to be suitable for each case. The form of the modulation signal (Sm) is not the essence of the present invention. In addition, such a modulation signal (Sm), may include a form consisting of a multi-bit digital signal portion or an analog signal portion which defines the rate at which lamp current is increased by the increase modulation, and a 1-bit binary signal portion which defines whether or not modulation is carried out.

Figure 17:
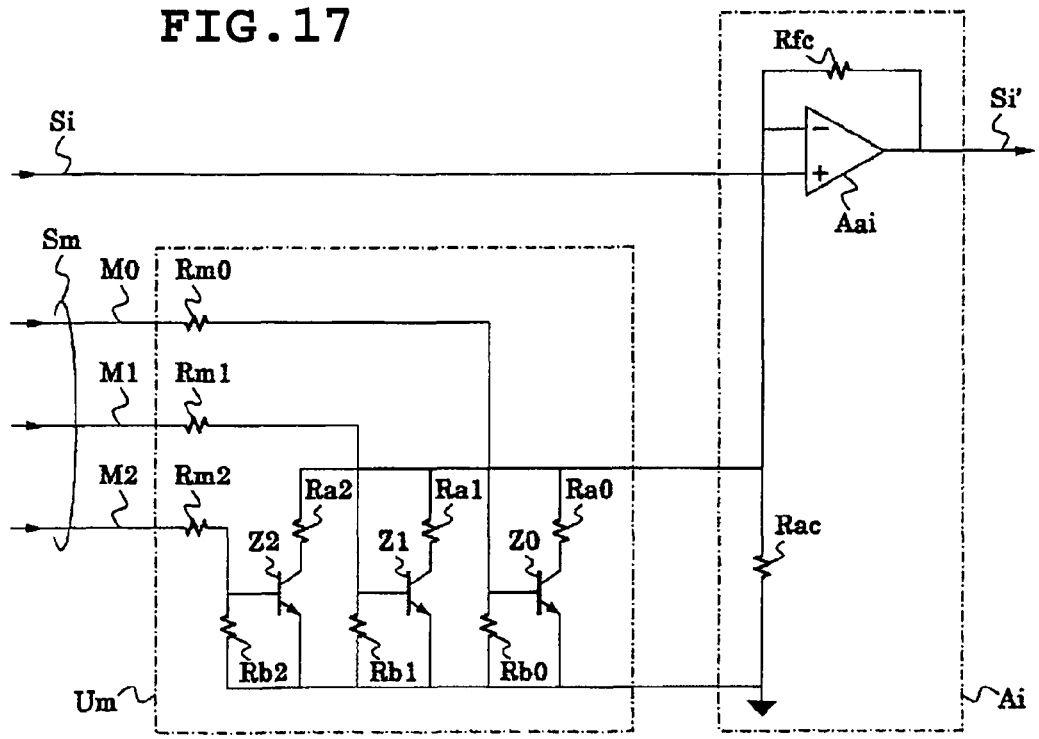
FIG. 17 is a schematic view of part of a discharge lamp lighting apparatus according to an embodiment.

FIG. 17 shows a schematic view of an example of the structure of the lamp current detection signal converter (Ai) shown in FIG. 16. In this figure, the modulation signal (Sm) is multi-bit digital signal data with the gradation, which consist of a modulation signal (M0, M1, M2). In the circuit shown in this figure, the reversed amplifying circuit is mainly made up of an operational amplifier (Aai), wherein the lamp current field detection signal (Si) is amplified by the operational amplifier (Aai), and the lamp current detection signal (Si') is generated as an output signal.

Since the output of the operational amplifier (Aai), is divided by combined resistance of a resistor (Rfc), a resistor (Rac), and resistors which are in parallel connected to the resistor (Rac) and the ground, and is inputted to the inverting input terminal of the operational amplifier (Aai), in which the gain of the noninversion amplifying circuit is determined by this voltage division ratio. Since switching elements (Z0, Z1, Z2) (transistors) are provided respectively, between the resistors (Ra0, Ra1, Ra2) connected in parallel to the resistor (Rac) and the ground, and since the resistors (Ra0, Ra1, Ra2) are electrically connected or disconnected when the switching elements (Z0, Z1, Z2) are turned on or off, respectively, it is possible to change the gain of this non-inversion amplifying circuit.

Since base terminals of the switching elements (Z0, Z1, Z2), are connected to respective modulation signals (M0, M1, M2) through the respective base resistors (Rm0, Rm1, Rm2), an ON/OFF state of each switching element (Z0, Z1, Z2), is controlled, corresponding to the truth/false of each bit of the modulation signal (M0, M1, M2), so that it is possible to change the gain of the non-inversion amplifying circuit based on combination of the truth and false of each bit of the modulation signal (M0, M1, M2).

In the relations of the resistors (Ra0, Ra1, Ra2), by setting up the resistance of the resistor (Ra0) twice the resistance of resistor (Ra1), and the resistance of the resistor (Ra1) twice the resistance of the resistor (Ra2), it is possible to change the gain of this non-inversion amplifying circuit as binary number data of three bits in which the modulation signal (M0) is set as the least significant bit, and the modulation signal (M2) is set as the most significant bit. However, there are no direct relation between the binary number data and the gain of the non-inversion amplifying circuit. In addition, although the case of a triplet is shown as an example, the number of bits is increased or decreased if needed and it can form similarly here.

Figure 18:
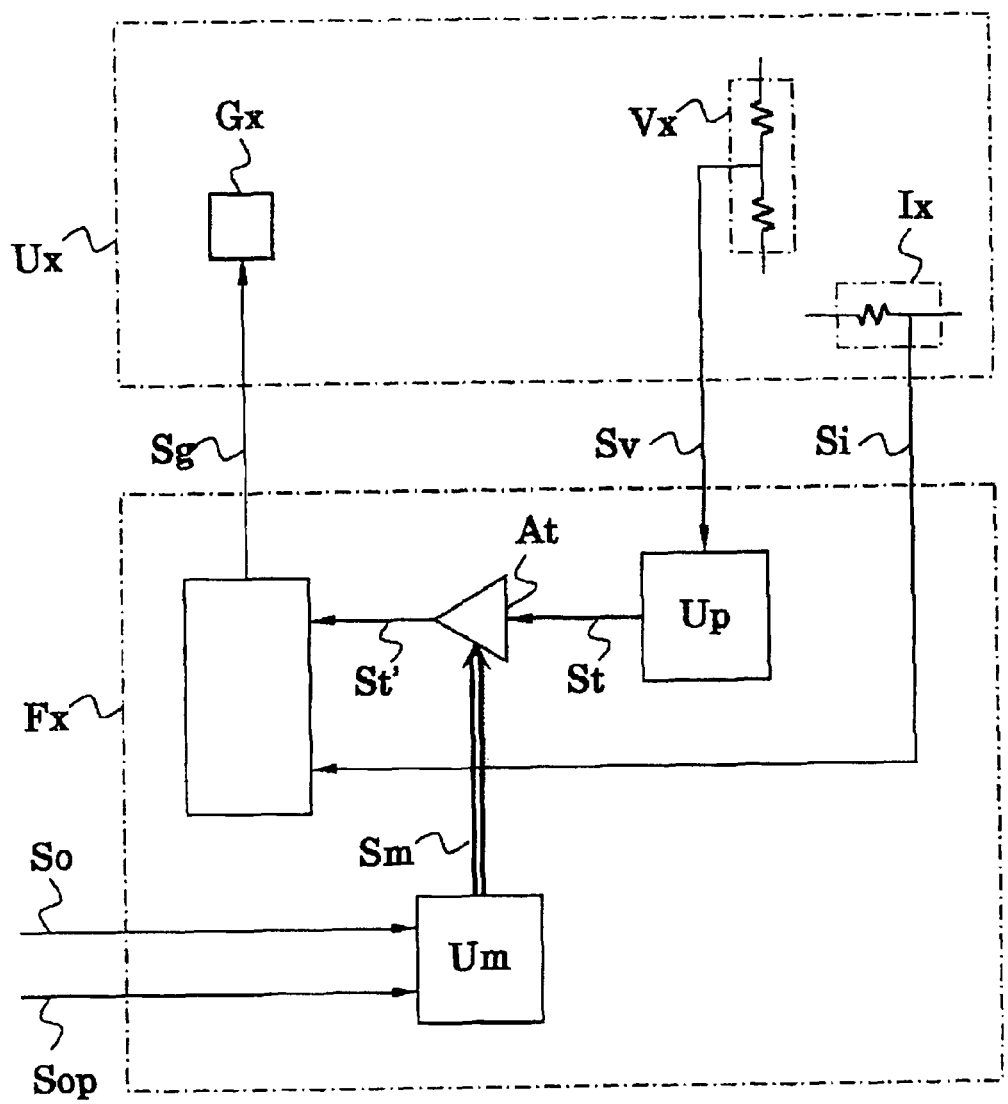
FIG. 18 is a schematic block diagram of a discharge lamp lighting apparatus according to an embodiment.

FIG. 18 is a schematic block diagram showing an electric supply control circuit (Fx). In FIG. 15, as described above, the lamp current modulation circuit (Um) is connected to the lamp current detection signal converter (Ai), and modulation is carried out on the gain thereof. The difference between the structure shown in FIG. 15 and that shown in FIG. 18 is that in FIG. 18, the lamp current modulation circuit (Um) is connected to a lamp current target signal converter (At), and according to the modulation signal (Sm), the modulation is carried out on the gain of the lamp current target signal converter (At), whereby the conversion lamp current target signal (St') is generated from the lamp current target signal (St). A feedback control operation that a power supply capacity control circuit (Ud) performs after the conversion lamp current target signal (St') is generated is the same as that of FIG. 15 which is described above.

Moreover, when the modulation signal (Sm) is changed and the gain of the lamp current target signal converter (At) increases, in a state where the lamp current detection signal (Si) and the conversion lamp current target signal (St') are in agreement so that feedback control is attained, the power supply capacity control circuit (Ud) determines that the value of the lamp current detection signal (Si) is too small, so that the output of the gate driving signal (Sg) is controlled so as to increase the lamp current (IL). The modulation function of the lamp current according to the modulation signal (Sm) is realized by such an operation.

Moreover, the lamp current target signal converter (At) can be realized by a non-inverting amplifier in which the gain is variable according to a combination of truth and false of each bit of the modulation signal (M0, M1, M2). In particular, what is necessary is just to replace Ai with At, Si with St, and Si' with St', respectively, in FIG. 17.

Although, as the circuit of the lamp current detection signal converter (Ai) or the lamp current target signal converter (At), which can carry out the modulation on the gain, an example in which the amplification factor of the non-inverting amplifier which is an operational amplifier is variable, is shown. The form of the circuit is not to the essence of the present invention, as long as it is a converter which can carry out modulation on gain. For example, a circuit which is mainly made up of an inverting amplifier, or a circuit in which an amplifier is not used but, for example, divided voltage ratio of dividing resistors is variable, can be used. Moreover, in case of carrying out the modulation on gain according to data having gradation which is made up of a multiple bit digital signal, for example, it can also be formed by an IC for DA conversion or by using a ladder resistor network.

In addition, as described above, in case the electric power control circuit (Up) outputs an analog lamp current target signal (St) by converting the digital original lamp current target data to the analog lamp current target signal (St) by a digital-to-analog converter, instead of multiplying a lamp current target signal (St) by the gain of a lamp current target signal converter (At) so as to generate a conversion lamp current target signal (St'), the original lamp current target data may be generated as if desired modulation is carried out, and A/D conversion may be carried out thereon so as to generate a conversion lamp current target signal (St'). However, in such a case, it is desirable to increase the dynamic range by using a converter having resolution of, for example, 12 bits or 16 bits etc. bits, for a digital-to-analog converter etc.

For example, when modulation is carried out so that lamp current may be increased in a certain polarity reversal phase, since lamp current is not constant (lamp voltage is not strictly constant, either), if an average load electric power value is controlled so as to be equal to the target electric power value PT, it is necessary to acquire an average load electric power value by measurement etc. As such methods, there may be a method of calculating an average value from instant measurement values of the lamp voltage (VL) and lamp current (IL) in an electric power control circuit (Up), a method of calculating an average value from the typical measurement value of lamp voltage, and the instant measurement value of lamp current, or a method of calculating an average value from the typical measurement value of lamp voltage and the typical measurement value of lamp current etc. As the method of obtaining the typical measurement value of lamp voltage (VL) and lamp current (IL), there may be a method of measuring the instant value of the lamp voltage or lamp current in a certain polarity reversal phase, or for example, a method of generating and measuring an analog-average signal by a low pass filter, such as a CR circuit, etc. However, since a high-speed processing is needed when the average is calculated from instant measurement value by the A-D converter and a microprocessor of the electric power control circuit (Up), the method of obtaining typical measurement value becomes advantageous in many cases.

In the above explanation about the modulation cycle initialization signal (Sop), the path through which the signal (Sop) is transmitted from the generating element is not described in concrete form. Although a path independent of the polarity reversal timing signal (So) may be provided so as to transmit the signal (Sop), if the modulation cycle initialization signal (Sop) is transmitted through the same path as that for the polarity reversal timing signal (So), it is possible to reduce the number of signal lines. Therefore, when the modulation cycle initialization signal (Sop) is activated, the modulation is, for example, carried out on the polarity reversal timing signal (So) in the image-processing section of the projector and the modulated signal (So) is sent therethrough. However, please note that the "modulation" described here is different from the "modulation" which is carried on brightness of a discharge lamp, in terms of an object on which the modulation is carried out.

An arbitrary modulation method can be used therefor as long as it is possible to easily recognize whether or not modulation has been carried out on the polarity reversal timing signal (So), that is, if the modulation cycle initialization signal (Sop) can be easily reproduced by demodulation. For example, in case where the polarity reversal timing signal (So) is transmitted in form of a signal with a short pulse width and a long pulse width, when a signal with the pulse width longer than regular time width is received, the received signal is processed as the polarity reversal timing signal (So), and conversely, when a signal with a short pulse width is received, the signal is recognized as a signal on which the modulation has been carried out so that it is possible to demodulate the received signal, regarding it as the modulation cycle initialization signal (Sop) which is received with the polarity reversal timing signal (So).

Figure 19A:
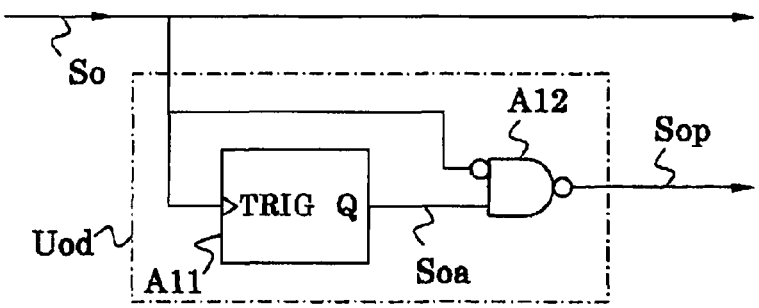
FIG. 19A is a schematic view of part of a discharge lamp lighting apparatus according to an embodiment.

FIG. 19A is a schematic view showing the structure of such an initialization information demodulation circuit (Uod). The polarity reversal timing signal (So) is inputted into a monostable multivibrator (A11). The monostable multivibrator (A11) outputs a pulse signal (Soa) with a constant time width ($\tau11$) in response to the leading edge of an input signal. The polarity reversal timing signal (So) and the pulse signal (Soa) are inputted into a logical gate (A12). The logical gate (A12) generates the modulation cycle initialization signal (Sop) which is low level, when the polarity reversal timing signals (So) is low level and the pulse signal (Soa) is high level.

Figure 19B:
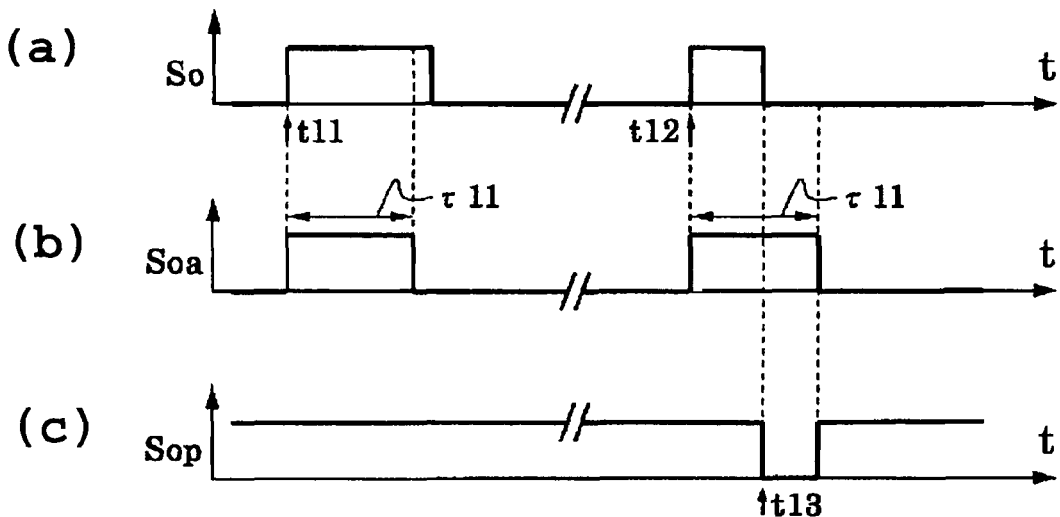
FIG. 19B is a schematic timing chart according to an embodiment.

FIG. 19B is a schematic timing chart showing an operation of the initialization information demodulation circuit (Uod). In the figure, (a) shows the polarity reversal timing signal (So), (b) shows the pulse signal (Soa), and (c) shows the modulation cycle initialization signal (Sop). Although the polarity reversal timing signal (So) with a long pulse width is received at time (t11), since the pulse signal (Soa) which is generated at the same time (t11) has already returned to low level at the time of an end of this pulse, the modulation cycle initialization signal (Sop) remains high level. On the other hand, although the polarity reversal timing signal (So) with a short pulse width is received at the time (t12), since the pulse signal (Soa) which is generated at the time (t12) remains high level at the time (t13) which is an end of this pulse high-level, the modulation cycle initialization signal (Sop) which is low level is generated in a period equal to the remaining time of the time width ($\tau11$) of the pulse signal (Soa), which is a period from time (t13) to the end thereof.

Another modulation method in which modulation is carried out on the polarity reversal timing signal (So). For example, in case where the polarity reversal timing signal (So) is transmitted in form of a single pulse and in form of two or more pulses, when only one pulse is received in a predetermined period, the received signal is processed as the polarity reversal timing signal (So), and conversely, when two or more pulses are received within the predetermined period, the signal is recognized as a signal on which the modulation is carried out so that it is possible to demodulate the received signal as the modulation cycle initialization signal (Sop) which is received with the polarity reversal timing signal (So).

Figure 20A:
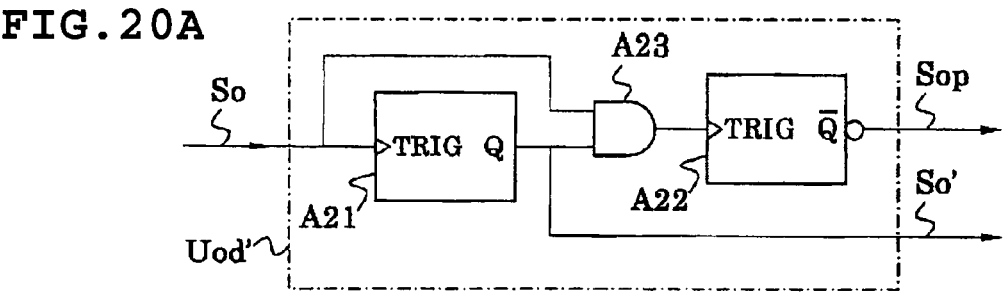
FIG. 20A is a schematic view of part of a discharge lamp lighting apparatus according to an embodiment.

FIG. 20A is a schematic view showing the structure of such an initialization information demodulation circuit (Uod'). The polarity reversal timing signal (So) is inputted into a monostable multivibrator (A21). The monostable multivibrator (A21) outputs a pulse signal (So') with a constant time width ($\tau21$) in response to the leading edge of an input signal. The polarity reversal timing signal (So) and the pulse signal (So') are inputted into an AND gate (A23). The AND gate (A23) passes the leading edge of the polarity reversal timing signal (So) therethrough so as to input it into the monostable multivibrator (A22) when the pulse signal (So') is high level. The monostable multivibrator (A22) generates the modulation cycle initialization signal (Sop) with low level during a fixed period ($\tau22$) in response to the leading edge of the input signal.

Figure 20B:
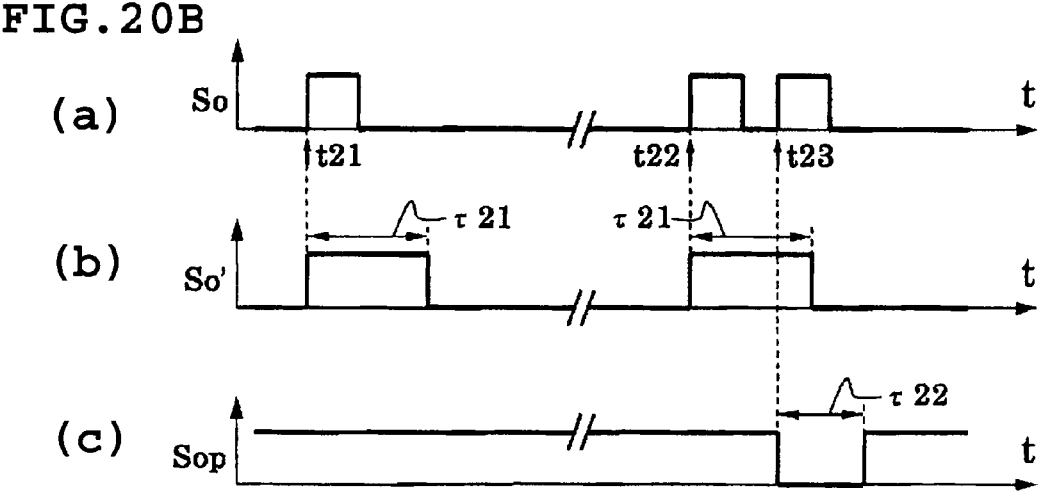
FIG. 20B is a schematic timing chart according to an embodiment

FIG. 20B is a schematic timing charts showing an operation of the initialization information demodulation circuit (Uod'). In the figure (a) shows the polarity reversal timing signal (So), (b) shows the pulse signal (So'), and (c) shows the modulation cycle initialization signal (Sop). Although the polarity reversal timing signal (So) with a single pulse is received by time (t21), since the following polarity reversal timing signal (So) has not been received before the pulse signal (So') which has been generated at the same time (t21) returns to low level, the modulation cycle initialization signal (Sop) remains high level. On the other hand, although the leading edge of the polarity reversal timing signal (So) which consists of two or more pulses is received at the time (t22), since the pulse signal (So') which is generated at the time (t22) remains high level at time (t23) when the second pulse is received, the monostable multivibrator (A22) is activated by the AND gate (A23), and the modulation cycle initialization signal (Sop) which has the time width ($\tau22$) is generated. In other circuit sections of the discharge lamp lighting apparatus, the pulse signal (So') can be used as a substitute of the polarity reversal timing signal (So).

In addition, as described above, when the lamp current modulation circuit (Um) is configured by using a microprocessor, it is suitable to configure the initialization information demodulation circuit (Uod) by using the microprocessor, too. In such a structure according to the embodiment, it is possible to adjust the cycle of appearance of color sequential light flux, and the cycle of a modulation pattern, without providing a modulation cycle initialization signal, independently.

Figure 21:
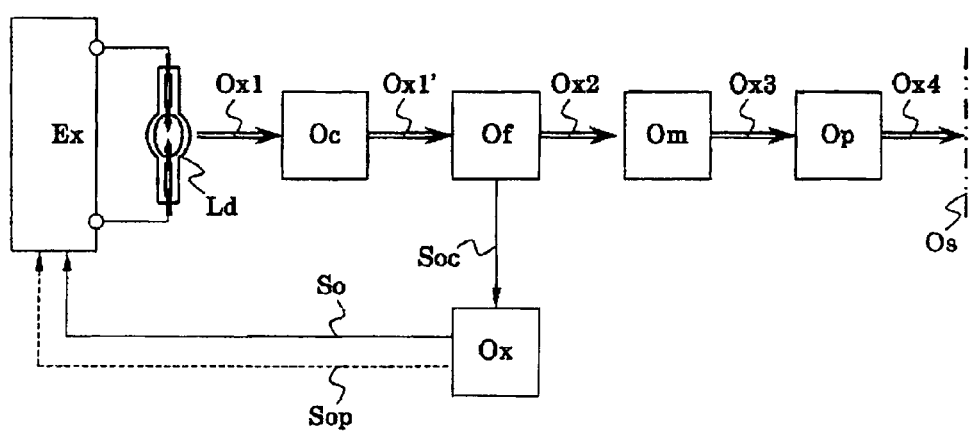
FIG. 21 is a schematic block diagram of a projector according to an embodiment.
Figure 22A:
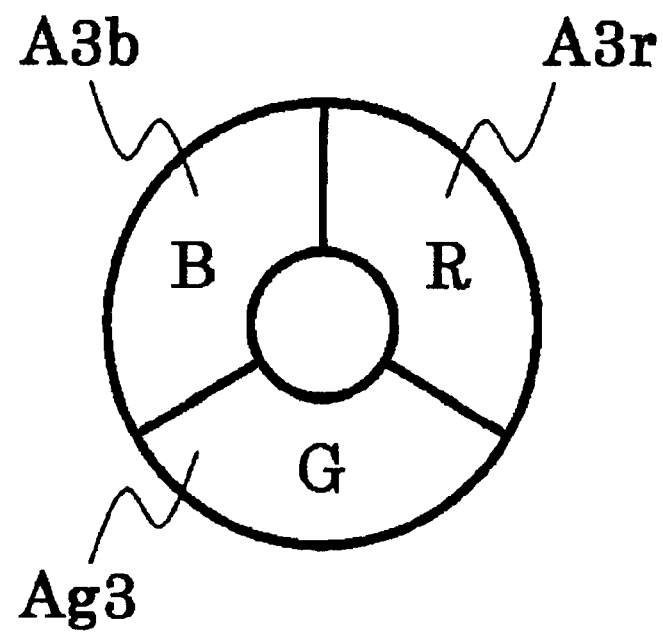
FIGS. 22A and 22B are schematic views of a filter.
Figure 22B:
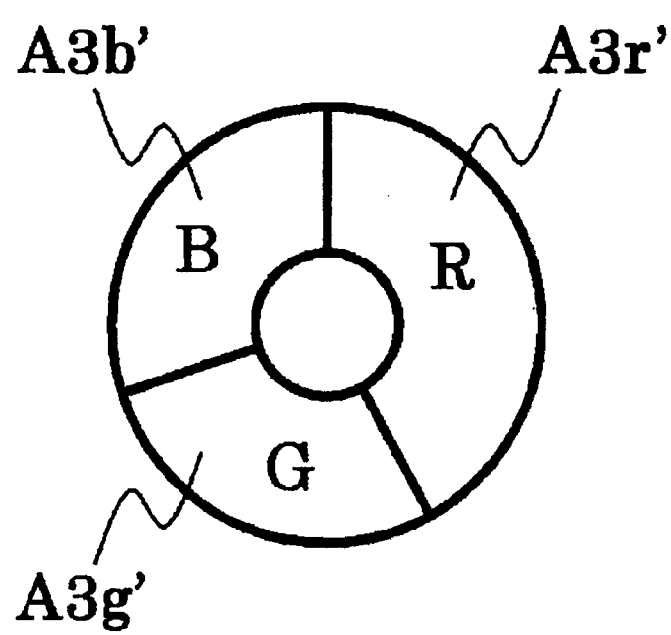

FIG. 21 is a schematic block diagram showing an example of a projector according to the embodiment. Light flux (Ox1) emitted from the discharge lamp (Ld) to be initiated and turned on by the discharge lamp lighting apparatus (Ex) of the embodiment, is converted into color sequential light flux (Ox2) by a dynamic color filter (Of), such as a rotation color wheel, through light flux (Ox1') which is passed through a condenser optical system (Oc) including a concave mirror, a condenser lens, etc. provided if needed. The color sequential light flux (Ox2) is modulated by a space modulation element (Om) which comprises a DMD (Trademark), a LCD, or a LCOS (reflected type liquid-crystal-display panel) etc. into color sequential image light flux (Ox3), and a projection image is formed on a screen (Os) which is provided outside the projector, or which is integrally provided in the projector, by a projection lens (Op).

The image processing unit (Ox) of the projector generates a signal (Soc) corresponding to the appearing color information of the dynamic color filters (Of) based on a pulse count value from a sensor such as a rotary encoder, or an initial detection of the rotational angle and a time passage count value etc., and based on the signal (Soc), generates a modulation switching timing signal (So) so as to transmit it to the discharge lamp lighting apparatus (Ex). Necessity is accepted at this time, In order identify a phase in one cycle of the polarity reversal timing signal (So), the modulation cycle initialization signal (Sop) is generated so as to be transmitted to the discharge lamp lighting apparatus (Ex), or modulation is carried out on the polarity reversal timing signal (So) to be transmitted to the discharge lamp lighting apparatus (Ex). In the above example shown in FIG. 16, although the modulation signal (Sm) is generated in the discharge lamp lighting apparatus (Ex) based on the polarity reversal timing signal (So), the modulation signal (Sm) may be generated in an image processing section of the projector.

At the present day, as a source of a video signal which may be inputted into a projector, there are various devices, such as a player of a personal computer, a videotape player, a DVD player and a TV tuner. Further, since these are two or more standards of such a video signal, such as NTSC and PAL, it is necessary for an image processing section provided in a projector to flexibly change mode of operation according to the kind of inputted picture signal. In order to demonstrate better image representation capacity especially with respect to change of a frame rate (the number of times of renewal of an image frame per unit time), the frequency of a dynamic color filter is sometimes set up to be twice or three times as high as a frame rate under a certain conditions. Moreover, brightness is more important than the capability of the color representation capacity of a color when a projector is used for presentations. However, the capability of the color representation is more important than brightness when it is used for a video image for viewers, such as a movie. Thus, since the suitable modes of an image processing operation differ from one another when a projector is used for the respective cases, it is necessary to change the modes of the image processing operation by switching the operation in addition to change of the source of a video signal.

To such a change of mode of the image processing operation, the even number and odd number in the number of times of the polarity reversals in one cycle of the polarity reversal timing signal (So) can be changed. For example, although, in transition of one color to an adjoining color of a dynamic color filter (Of), the image-processing section of a projector may generate the polarity reversal timing signal (So), with a change of the mode of an image processing operation, the polarity reversal timing signal (So) may be controlled so as not to be generated. Or, for example, although in the middle of the area of one certain color in the dynamic color filter (Of), the image-processing section of the projector may generate the polarity reversal timing signal (So), with a change of the mode of an image processing operation, the polarity reversal timing signal (So) may be controlled so as not to be generated.

As described above, when the number of times of the polarity reversals in one cycle of the polarity reversal timing signal (So) is odd number of times, although the problem of the unbalance of the thermal load in two electrodes of the discharge lamp does not occur, in this case, since there is no problem even if an operation in which pulse-like parts of the polarity reversal operation based on the polarity reversal timing signal (So) is disregarded by odd number of times is intermittently inserted according to the embodiment, the embodiment may be usually applied thereto regardless of whether the number of times of the polarity reversals in one cycle of the polarity reversal timing signal (So) is even or odd.

Moreover, since it is possible to specify the phase in one cycle of the polarity reversal timing signal (So), based on the modulation cycle initialization signal (Sop) sent from the image-processing section of a projector, or based on the modulation cycle initialization signal (Sop) generated by the initialization information demodulation circuit (Uod) from the polarity reversal timing signal (So) on which the modulation is carried out. In the discharge lamp lighting apparatus according to the embodiment, it is possible to determine whether the number of times of the polarity reversals in one cycle of the polarity reversal timing signal (So) is even, or odd, by counting the number of the polarity reversal timing signals (So) after the modulation cycle initialization signal (Sop) is received until the following modulation cycle initialization signal (Sop) is received. Therefore, when it is determined that the number is even, the operation in which pulse-like parts of the polarity reversal operation based on the above mentioned polarity reversal timing signal (So) is disregarded by odd number of times is intermittently inserted. On the contrary, when it is determined that the number is odd, the intermittent operation in which the pulse-like parts of the polarity reversal operation based on the polarity reversal timing signal (So) are disregarded by odd number of times may not be inserted.

In this specification, the circuit structures are described at minimum, in order to explain the operations and the functions of the light source apparatuses according to the embodiment. Therefore, details of the circuit structures or the operations are determined at time of the design thereof. That is, for example, determinations of the polarity of signals, or originality and creativity, such as selections, additions, or omissions of concrete circuit elements, convenience of procurements of elements, or changes based on economic reasons are premised on being carried out at the time of the design of actual apparatus.

The mechanism for especially protecting circuit elements, such as switching elements (for example, FET) of a power supply apparatus, from breakage factors, such as an overvoltage, and overcurrent, or overheating, or the mechanism for reducing a radiation noise or a conduction noise, generated with an operation of the circuit element of the power supply apparatus or preventing the generated noise from releasing to the outside, for example, a snubber circuit, and a varistor, a clamp diode, a current restriction circuit (including a pulse by pulse system), a noise filter choke coil of a common mode, or normal mode, a noise filter capacitor, etc. are premised on being added to each part of circuit arrangement shown in the embodiments if needed. The structure of the discharge lamp lighting apparatus is not limited to the circuits disclosed in this specification, or nor waveforms or timing charts described herein.

The preceding description has been presented only to illustrate and describe exemplary embodiments of the discharge lamp lighting apparatus and a projector according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for lighting a discharge lamp, comprising:
    an inverter which reverses a polarity of an output voltage and applies alternating voltage to the discharge lamp; and
    an inverter control circuit which generates an inverter control signal defining a polarity reversal operation of the inverter, based on a polarity reversal timing signal,
    wherein when the number of polarity reversals in one cycle of the polarity reversal timing signal is even, the inverter control circuit intermittently performs a first operation in which successive pulse-like part of the polarity reversal operation based on the polarity reversal timing signal is disregarded by odd number of times.

2. The discharge lamp lighting apparatus according to claim 1, wherein a periodical modulation is performed on lamp current flowing through the discharge lamp, synchronizing with the polarity reversal timing signal.

3. The discharge lamp lighting apparatus according to claim 2, further including an initialization information demodulation circuit which determines whether the polarity reversal timing signal is modulated and specifies a phase in one cycle of the polarity reversal timing signal, wherein when the initialization information demodulation circuit receives the polarity reversal timing signal and determines that the polarity reversal timing signal is modulated, a count value of a polarity reversal phase track counter is initialized in order to hold the phase of the one cycle of the polarity reversal signal.

4. The discharge lam lighting apparatus according to claim 1, wherein a second operation in which successive parts of the polarity-reversal operation based on the polarity reversal timing signal are disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

5. The discharge lam lighting apparatus according to claim 2, wherein a second operation in which successive parts of the polarity-reversal operation based on the polarity reversal timing signal is disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

6. The discharge lam lighting apparatus according to claim 3, wherein a second operation in which successive parts of the polarity-reversal operation based on the polarity reversal timing signal are disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

7. A projector for projecting an image by using light flux generated from a discharge lamp, wherein the discharge lamp is lighted by a discharge lamp lighting apparatus, the discharge lamp lighting apparatus comprising: an inverter which reverses a polarity of an output voltage and applies alternating voltage to the discharge lamp; and an inverter control circuit which generates an inverter control signal defining a polarity reversal operation of the inverter, based on a polarity reversal timing signal, wherein when the number of polarity reversals in one cycle of the polarity reversal timing signal is even, the inverter control circuit intermittently performs a first operation in which successive pulse-like part of the polarity reversal operation based on the polarity reversal timing signal is disregarded by odd number of times.

8. The projector according to claim 7, wherein a periodical modulation is performed on lamp current flowing through the discharge lamp, synchronizing with the polarity reversal timing signal.

9. The projector according to claim 8, further including an initialization information demodulation circuit which determines whether the polarity reversal timing signal is modulated and specifies a phase in one cycle of the polarity reversal timing signal, wherein when the initialization information demodulation circuit receives the polarity reversal timing signal and determines that the polarity reversal timing signal is modulated, a count value of a polarity reversal phase track counter is initialized in order to hold the phase of the one cycle of the polarity reversal signal.

10. The projector according to claim 7, wherein a second operation in which successive parts of the polarity-reversal operation based on the polarity reversal timing signal are disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

11. The projector according to claim 8, wherein a second operation in which successive parts of the polarity-reversal operation based on the polarity reversal timing signal is disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

12. The projector according to claim 9, wherein a second operation in which successive parts of the polarity-reversal operation based on the polarity reversal timing signal is disregarded by even number of times, is performed between the first operation in which the successive pulse-like part of the polarity-reversal operation based on the polarity reversal timing signal is disregarded by odd number of times, and a third operation subsequent to the first operation, in which successive pulse-like part of the polarity-reversal operation based on the inserted polarity reversal timing signal is disregarded by odd number of times.

13. The projector according to claim 10, wherein the image is projected by using color sequential light flux converted by a dynamic color filter, and the polarity reversal timing signal is generated depending on a color of the color sequential light flux.

* * * * *